(12) United States Patent
Zhu et al.

(10) Patent No.: US 12,219,374 B1
(45) Date of Patent: Feb. 4, 2025

(54) COORDINATED MULTIPLE ACCESS METHOD FOR MULTI-CELL GROUND-TO-AIR DATA TRANSMISSION

(71) Applicant: BEIHANG UNIVERSITY, Beijing (CN)

(72) Inventors: Yanbo Zhu, Beijing (CN); Jingjing Zhao, Beijing (CN); Kaiquan Cai, Beijing (CN); Quan Zhou, Beijing (CN); Xin Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/814,568

(22) Filed: Aug. 25, 2024

(30) Foreign Application Priority Data

Nov. 24, 2023 (CN) .......................... 202311581151.6

(51) Int. Cl.
*H04W 24/02* (2009.01)
*H04B 7/06* (2006.01)
*H04W 84/06* (2009.01)

(52) U.S. Cl.
CPC .......... *H04W 24/02* (2013.01); *H04B 7/0617* (2013.01); *H04B 7/0626* (2013.01); *H04W 84/06* (2013.01)

(58) Field of Classification Search
CPC .... H04W 24/02; H04W 84/06; H04B 7/0617; H04B 7/0626
See application file for complete search history.

(56) References Cited

U.S. PATENT DOCUMENTS 11,522,593 B1   12/2022   Fan et al.
11,522,600 B1 * 12/2022   Rakib .................... H04B 7/155
(Continued)

FOREIGN PATENT DOCUMENTS

CN    103826276 A    5/2014
CN    111510192 A    8/2020
(Continued)

OTHER PUBLICATIONS

Dai, Cuiqin et al., Joint Antennae Selection and Power Allocation Algorithm in CoMP System, Journal of Chongqing University of Posts and Telecommunications (Natural Science Edition), 25(1): 90-95, 2013.
(Continued)

*Primary Examiner* — Parth Patel
(74) *Attorney, Agent, or Firm* — Porus IP LLC

(57) ABSTRACT

The present disclosure provides a coordinated multiple access method for multi-cell ground-to-air data transmission, and belongs to the technical field of wireless communication. The method comprises the following steps: S1, constructing a model of a coordinated multiple access system for multi-cell ground-to-air data transmission; S2, calculating a transmission rate of an aircraft, and constructing a multi-cell airspace and power domain resource allocation optimization problem by taking maximizing a system transmission rate as an optimization objective; S3, constructing a Markov decision process model; S4, solving the optimization problem using a multi-agent deep reinforcement learning algorithm. The system transmission rate is maximized under the condition that the aircraft can decode the signal correctly and satisfy the constraint of minimum transmission rate, thereby realizing ground-to-air high-speed data transmission. The present disclosure adopts the coordinated multiple access method for multi-cell ground-to-air data trans- (Continued)

mission, which can realize fast online decision, satisfying the requirements of ground-to-air high-speed data transmission in the high dynamic flight scenario of the aircraft.

2 Claims, 4 Drawing Sheets

(56) References Cited

U.S. PATENT DOCUMENTS

| | | | | |
|---|---|---|---|---|
| 2010/0331037 A1* | 12/2010 | Jen | ................. | H04L 1/1887 |
| | | | | 455/522 |
| 2011/0001652 A1* | 1/2011 | Martino | ................ | G01S 7/38 |
| | | | | 342/14 |
| 2013/0195025 A1* | 8/2013 | Chatterjee | ............ | H04W 72/20 |
| | | | | 370/329 |
| 2014/0099900 A1* | 4/2014 | Cili | ................. | H04W 24/02 |
| | | | | 455/67.11 |
| 2015/0311924 A1* | 10/2015 | Robineau | ............. | G07C 9/20 |
| | | | | 701/2 |
| 2018/0293897 A1* | 10/2018 | Murphy | ............. | G08G 5/0069 |
| 2020/0154349 A1* | 5/2020 | Cao | ................ | H04W 48/20 |
| 2021/0116255 A1* | 4/2021 | Kim | ................ | H04W 48/18 |
| 2021/0211900 A1* | 7/2021 | Pius | ................ | H04W 24/08 |
| 2023/0077176 A1* | 3/2023 | Yan | ................ | H04W 72/53 |
| 2023/0370885 A1* | 11/2023 | Lee | ................ | H04B 7/0626 |

FOREIGN PATENT DOCUMENTS

| | | | | |
|---|---|---|---|---|
| CN | 114423044 A | | 4/2022 | |
| CN | 112583566 B | * | 3/2023 | ............ H04L 5/003 |
| CN | 116546021 A | | 8/2023 | |
| EP | 4447517 A1 | * | 10/2024 | ........... H04W 16/22 |

OTHER PUBLICATIONS

First Office Action in Chinese Application No. 202311581151.6 mailed on Jan. 1, 2024, 12 pages.

Decision to Grant a Patent in Chinese Application No. 202311581151.6 mailed on Jan. 17, 2024, 5 pages.

* cited by examiner

COORDINATED MULTIPLE ACCESS METHOD FOR MULTI-CELL GROUND-TO-AIR DATA TRANSMISSION

CROSS-REFERENCE TO RELATED APPLICATIONS

This application claims priority to Chinese Application No. 202311581151.6, filed on Nov. 24, 2023, the entire contents of which are incorporated herein by reference.

TECHNICAL FIELD

The present disclosure relates to the field of wireless communication technology, and in particular to a coordinated multiple access method for multi-cell ground-to-air data transmission.

BACKGROUND

An aeronautical communication system is a key infrastructure to ensure the safe and efficient operation of air transportation, and the future aviation mobile communication technology is developing towards the trend of broadband high-capacity, based on performance requirements. However, the spectrum resources of the aeronautical broadband communication system are limited, and it is difficult to meet the high-capacity demand of aeronautical broadband communication. In addition, ground stations have limited coverage, and due to the high-speed movement characteristics of an aircraft, the aircraft often crosses multiple cells and requires to communicate at the edge of the cell. However, the aircraft at the cell edge experiences severe inter-cell interference from ground stations in other cells, and thus the transmission quality is severely degraded relative to the aircraft in the central region of the cell.

The multi-antenna multi-access technology has natural advantages in enhancing spectral efficiency. Firstly, multi-antenna technology provides additional airspace freedom, which can realize the efficient utilization of wireless resources via Space Division Multiple Access (SDMA), and obtain considerable capacity gain under the restricted condition of aeronautical broadband communication spectrum; secondly, Non-Orthogonal Multiple Access (NOMA) technology actively introduces inter-aircraft interference, superimposes the information of multiple aircrafts on the same time-frequency resources, distinguishes different aircrafts in the power domain, and uses Successive Interference Cancellation (SIC) technology at the receiving end to resolve the superimposed multi-aircraft signals, thereby improving the spectrum efficiency. The Coordinated Multiple Points (CoMP) transmission technology can link ground stations with fiber optic links to form backhaul links to share information, and jointly transmit useful signals to the aircraft to inhibit interference from neighboring cells via multiple ground stations, thus solving the problem of poor transmission quality of the aircraft at the edge of the cell.

However, the sparse, three-dimensional, and fast time-varying multipath of the ground-to-air channel leads to an increased probability of strong correlation of the aircraft channel, limiting the performance of SDMA, and the effectiveness of NOMA decreases significantly when there are more aircrafts. Therefore, a single multi-access method cannot meet the high spectral-efficiency requirements of the ground-to-air communication, and a combination of multiple multi-access methods is required. However, combining the multiple multi-access methods may make the interference components of the received signal of the aircraft complex, and the transmission power of the ground station to the aircraft and the beamforming matrix variables are highly coupled, which greatly increases the complexity of the problem. In addition, the high-speed movement of the aircraft has a high demand on the timeliness of the algorithm, which requires the algorithm for real-time online fast resource allocation.

SUMMARY

Some embodiments of the present disclosure provide a coordinated multiple access method for multi-cell ground-to-air data transmission. The method may be implemented based on a processor and may comprise:

S1, constructing a model of a coordinated multiple access system for multi-cell ground-to-air data transmission, including constructing a scenario model and constructing a channel model; wherein the constructing a scenario model may include that: each cell consists of a cell-center area and a cell-edge area; a ground station is located at a center of a corresponding cell, and the ground station implements backhaul transmission through optical fibers; an aircraft located in the cell-center area is served by a ground station to which the aircraft belongs, and an aircraft located in the cell-edge area is served by a plurality of ground stations to implement data transmission simultaneously using a CoMP technology;

three adjacent ground stations may form a consideration range of a regular hexagon as three non-adjacent vertices of the regular hexagon;

the constructing the channel model may include that:

each ground station sends signals to a single-antenna aircraft using a horizontally placed uniform planar array antenna, wherein a count of available subcarriers is denoted as X, a total count of planar array antennas is denoted as N, and a transmission bandwidth is denoted as B; wherein the channel model for aeronautical broadband communication may be constructed based on a Saleh-Valenzuela channel model; a channel of an x-th subcarrier between the ground station and the aircraft may be expressed as:

$$h[x] = \sum_{l=1}^{L} \alpha_l e^{j2\pi f_x \tau_l} a^H(\theta_l, \varphi_l) \qquad (1)$$

wherein L denotes a count of multipaths, $\alpha_l$ denotes a gain of an l-th path, j denotes an imaginary unit, $f_x$ denotes a frequency selective fading coefficient on a subcarrier x, $\tau_l$ denotes an arrival delay of the l-th path, $a(\theta_l, \varphi_l)$ denotes an array steering vector, $\theta_l$ denotes a pitch angle of the aircraft relative to a planar array, $\varphi_l$ denotes an azimuth angle of the aircraft relative to the planar array, and H denotes conjugate transpose of a matrix;

S2. calculating a transmission rate of the aircraft within the consideration range, and constructing a multi-cell airspace and power domain resource allocation optimization problem by taking maximizing a system transmission rate as an optimization objective;

S3. constructing a Markov decision process model based on the optimization objective and constraints;

S4, solving the optimization problem using a multi-agent deep reinforcement learning algorithm; wherein i, n, and z denote different aircrafts;

in S1, the three ground stations may simultaneously serve a cell-edge aircraft k through CoMP transmission, let $\alpha \in 1,2,3$ denote a ground station index, $h_{a,k}[x]$ denotes a channel response matrix between a ground station a and the cell-edge aircraft k on the subcarrier x, $m_{a,k}$ denotes a cluster of the cell-edge aircraft k in the ground station a, $m_a'$ denotes other clusters in the ground station a, $\mathcal{G}_{m_{a,k}}$ and $\mathcal{G}_{m_a'}$ denote a set of aircrafts in the clusters $m_{a,k}$ and $m_a'$, respectively, $w_{a,m_{a,k}}[x]$ an $w_{a,mm_a'}[x]$ denote hybrid beamforming vectors of the ground station a for the clusters $m_{a,k}$ and $m_a'$ on the subcarrier x respectively, $p_{a,k}[x]$, $p_{a,i}[x]$, and $p_{a,n}[x]$ denote power allocation variables of the ground station a for aircrafts k, i, n on the subcarrier x, respectively, $s_k[x]$, $s_i[x]$, and $s_n[x]$ denote signals received by the aircrafts k, i, n on the subcarrier x, respectively, and $n_k[x]$ denotes noise of the cell-edge aircraft k on the subcarrier x;

the signal received by the cell-edge aircraft k on the subcarrier x may be expressed as:

$$y_k[x] = \underbrace{\sum_{a=1}^{3} h_{a,k}[x] w_{a,m_{a,k}}[x] \sqrt{p_{a,k}[x]} s_k[x]}_{\text{useful signal}} + \qquad (2)$$

$$\underbrace{\sum_{a=1}^{3} \sum_{i \neq k, i \in \mathcal{G}_{m_{a,k}}} h_{a,k}[x] w_{a,m_{a,k}}[x] \sqrt{p_{a,i}[x]} s_i[x]}_{\text{Intra-cluster interference}} +$$

$$\underbrace{\sum_{a=1}^{3} \sum_{m_a' \neq m_{a,k}, n \in \mathcal{G}_{m_a'}} h_{a,k}[x] w_{a,m_a'}[x] \sqrt{p_{a,n}[x]} s_n[x]}_{\text{inter-cluster interference}} + n_k[x]$$

assuming considering a scenario of coherent joint transmission (CJT) based on an ideal backhaul capacity, real-time channel state information may be shared among the ground stations, a capacity gain may be obtained by coherent merging of multipath signals at the cell-edge aircraft k, and power $p_{desired}$ of a received useful signal is a power of a sum of the useful signals from all the ground stations, which may be expressed as:

$$P_{desired} = \left| \sum_{a=1}^{3} h_{a,k}[x] w_{a,m_{a,k}}[x] \sqrt{p_{a,k}[x]} \right|^2 \qquad (3)$$

a signal interference received by a cell-center aircraft k' served by a ground station a' may include a signal interference from the cell-edge aircraft, a signal interference from the cell-center aircraft of a current cell and neighboring cells, $K^C$ denotes a set of the cell-edge aircrafts, $K_a^{N'}$ and $K_a^N$ denote a set of cell-center aircrafts served by the ground station a' and a set of cell-center aircrafts served by the ground station a, respectively, $h_{a',k'}[x]$ and $h_{a,k'}[x]$ denote channels from the ground station a' and the ground station a to the cell-center aircraft k' on the subcarrier x, respectively, $p_{a',k'}[x]$ and $p_{a,k'}[x]$ denote power allocation variables of the ground station a' to the aircrafts k' and i on the subcarrier x, respectively, $s_{k'}[x]$ denotes a signal received by the cell-center aircraft k' on the subcarrier x, $m_{a',k'}$ and $m_{a',i}$ denote clusters of the aircrafts k' and i in the ground station a', respectively, $m_{a,k}$ and $m_{a,n}$ denote the clusters of the aircrafts k and n in the ground station a, respectively, $w_{a',m_{a,k}}[x]$ and $w_{a',m_{a,i}}[x]$ respectively denote hybrid beamforming vectors of the ground station a' on subcarrier x for the clusters $m_{a',k'}$ and $m_{a',i}$; $w_{a,m_{a,k}}[x]$ and $w_{a,m_{a,n}}[x]$ denote the hybrid beamforming vectors of the ground station a on the subcarrier x for the clusters $m_{a,k}$ and $m_{a,n}$, respectively; $n_{k'}[x]$ denotes noise of the cell-center aircraft k' on the subcarrier x, and the signal received by the cell-center aircraft k' served by the ground station a' on the subcarrier x may be expressed as:

$$y_{a',k'}[x] = \underbrace{h_{a',k'}[x] w_{a',m_{a',k'}}[x] \sqrt{p_{a',k'}[x]} s_{k'}[x]}_{\text{useful signal}} + \qquad (4)$$

$$n_{k'}[x] + \underbrace{\sum_{k \in K^c} \sum_{a=1}^{3} h_{a,k'}[x] w_{a,k}[x] \sqrt{p_{a,k}[x]} s_k[x]}_{\text{signal interference from the cell-edge aircrafts}} +$$

$$\underbrace{\sum_{i \in K_{a',i \neq k}^N} h_{a',k'}[x] w_{a,m_{a',i}}[x] \sqrt{p_{a',i}[x]} s_i[x]}_{\text{signal interference from the cell-center aircrafts of the current cell}} +$$

$$\underbrace{\sum_{a \neq a'} \sum_{n \in K_a^N} h_{a,k'}[x] w_{a,m_{a,n}}[x] \sqrt{p_{a,n}[x]} s_n[x]}_{\text{signal interference from cell-center aircrafts of neighboring cells}}$$

in S2, the calculating a transmission rate of the aircraft within the consideration range, and constructing a multi-cell airspace and power domain resource allocation optimization problem by taking maximizing a system transmission rate as an optimization objective may include:

S21. calculating a transmission rate of the cell-edge aircraft k; wherein $a_{k,i}^{m_{a,k}}$ denotes an SIC decoding order of the cell-edge aircraft k and the aircraft i of the cluster $m_{a,k}$ in the ground station a, $a_{k,i}^{m_{a,k}}=0$ means that a receiver of the cell-edge aircraft k of the cluster $m_{a,k}$ first decodes the signal of the aircraft i and eliminates the signal using an SIC technology; otherwise, $a_{k,i}^{m_{a,k}}=1$ means that the receiver of the cell-edge aircraft k of the cluster $m_{a,k}$ first decodes a signal of the cell-edge aircraft k, accordingly, it is deduced that the transmission rate $R_k[x]$ between the ground station a and the cell-edge aircraft k on the subcarrier x may be expressed as:

$$R_k[x] = B\log_2\left(1 + \frac{P_{desired}}{I_C + I_N + \sigma_k^2}\right) \qquad (5)$$

$$I_C = \sum_{i \neq k, i \in K^c} \sum_{a=1}^{3} \alpha_{k,i}^{m_{a,k}}[x] |h_{a,k}[x] w_{a,m_{ai}}[x] \sqrt{p_{a,i}[x]}|^2$$

$$I_N = \sum_{a=1}^{3} \sum_{n \in K_a^N} |h_{a,k}[x] w_{a,m_{an}}[x]|^2 p_{a,n}[x]$$

wherein $I_C$ denotes a signal interference of other cell-edge aircrafts except the cell-edge aircraft k, $I_N$ denotes the signal interference of the cell-center aircraft, $\sigma_k^2$ denotes noise power; and $w_{a,m_{a,i}}[x]$ denotes a hybrid beamforming vector of the ground station a for the cluster $m_{a,i}$ on the subcarrier x;

S22, calculating a transmission rate of the cell-center aircraft k'; wherein the transmission rate $R_{a,k'}[x]$ of the cell-center aircraft k' served by the ground station a' may be expressed as:

$$R_{a,k'}[x] = B\log_2\left(1 + \frac{|h_{a',k'}[x]w_{a',m_{a',k'}}[x]|^2 p_{a',k'}[x]}{ICI_C + INI_N + ICI_N + ICI_{cell} + \sigma_{k'}^2}\right) \quad (6)$$

$$ICI_C = \sum_{k \in \{K^C - \mathcal{G}_{m_{a',k'}}\}} \sum_{a=1}^{3} |h_{a,k}[x]w_{a,m_{a,k}}[x]\sqrt{p_{a,k}[x]}|^2$$

$$INI_N = \sum_{z \neq k', z \in \mathcal{G}_{m_{a',k'}}} \alpha_{k',z}^{m_{a',k'}}[x] |h_{a',k'}[x]w_{a',m_{a',k'}}[x]|^2 p_{a',z}[x]$$

$$ICI_N = \sum_{i \in \{K_{a'}^N - \mathcal{G}_{m',k'}\}} |h_{a',k'}[x]w_{a',m_{a',i}}[x]|^2 p_{a',i}[x]$$

$$ICI_{cell} = \sum_{a \neq a'} \sum_{n \in K_a^N} |h_{a,k'}[x]w_{a,m_{a,n}}[x]|^2 p_{a,n}[x]$$

wherein $ICI_C$ denotes an inter-cluster interference to the cell-center aircraft k' from the cell-edge aircraft, and $ICI_C$ may be 0 if the cell-center aircraft k' and the cell-edge aircraft are in the same cluster; $INI_N$ and $ICI_N$ denote signal interferences of the cell-center aircrafts in the same cluster and different clusters as the cell-center aircraft k' in the ground station a', respectively; $ICI_{cell}$ denotes inter-cell signal interferences caused by cell-center aircrafts served by neighboring ground stations; $\mathcal{G}_{m_{a',k'}}$ a set of aircrafts in a cluster $m_{a',k'}$, $p_{a',z}[x]$ denotes a power allocation variable of the ground station a' to an aircraft z on the subcarrier x, $a_{k',z}^{m_{a',k'}}$ denotes an SIC decoding order of the cell-edge aircraft k' and the aircraft z of the cluster $m_{a',k'}$ in the ground station a'; and $\sigma_k^2$ denotes noise power of the aircraft k';

S23, constructing a multi-cell joint transmission resource allocation optimization problem; wherein the optimization variables are transmission power of each ground station to each aircraft and a hybrid analog and digital beamforming vector for each cluster, P denotes total power that each ground station can allocate to the aircraft on each subcarrier, $W_{a,A}$ denotes an analog beamforming matrix of the ground station a, $\mathcal{F}$ denotes all elements in $W_{a,A}$, $W_{a,A}(c_x, c_y)$ denotes elements at coordinates $(c_x, c_y)$ in the matrix $W_{a,A}$, $w_{a,D,m_{a,n}}[x]$ denotes a digital beamforming vector of the ground station a for a cluster $m_{a,n}$ on the subcarrier x, which satisfies $w_{a,m_{a,n}}[x] = W_{a,A} \times w_{a,D,m_{a,n}}[x]$, $R_n[x]$ denotes a transmission rate of an aircraft n on the subcarrier x, $R_n^{thr}[x]$ denotes a minimum transmission rate threshold of the aircraft n, and constructing the multi-cell joint transmission resource allocation optimization problem may be expressed as follows:

$$\max_{\{W_{a,A}, w_{a,D,n_{a,n}}[x], p_{a,n}[x]\}} \sum_{x=1}^{X}\left(\sum_{k \in K}^{c} R_k[x] + \sum_{a'=1}^{3}\sum_{k' \in K_{a'}^N} R_{a',k'}[x]\right)$$

C1: $\sum_{n \in \{K^C \cup K_a^N\}} p_{a,n}[x] \leq P, \forall a, x$

C2: $p_{a,n}[x] \geq 0, \forall a, n, x$

C3: $|W_{a,A} w_{a,D,m_{a,n}}[x]| = 1, \forall a, m_{a,n}, x$

C4: $|W_{a,A}(c_x, c_y)| = \frac{1}{\sqrt{N}}, \forall a, (c_x, c_y) \in \mathcal{F}$ C5: $R_n[x] \geq R_n^{thr}[x], \forall x, a, n \in \{K^C \cup K_a^N\}$ wherein a constraint C1 denotes a maximum transmission power limit of the ground station; a constraint C2 denotes a non-negative value constraint of power; a constraint C3 denotes a normalization constraint of the hybrid beamforming vector of the ground station; a constraint C4 denotes a constant modulus constraint of elements in an analog beamforming matrix; and a constraint C5 denotes a minimum transmission rate constraint of the aircraft n;

in order to correctly implement SIC decoding at the aircraft, a minimum value of the transmission rate of the cell-center aircraft k' served by the ground station a' at an aircraft of which a decoding order is later than the decoding order of the cell-center aircraft k' may be taken as the transmission rate of the cell-center aircraft k', which may be expressed as:

$$R_{a',k'}[x] = \min_{i \in \Phi_{a',k'}\{R^{m_{a',k'},i \to k}}[x]\} \quad (8)$$

wherein $\Phi_{a',k'}$ denotes a set of aircrafts in the same cluster as the cell-center aircraft k' in the ground station a' and whose decoding orders are not earlier than that of the cell-center aircraft k', i.e., $\Phi_{a',k} = \{\alpha_{i,k'}^{m_{a',k}}[x]=0\} \cup \{k'\}$, wherein $\alpha_{i,k'}^{m_{a,k}}[x]$ denotes an SIC decoding order of the cell-center aircraft k' and an aircraft i of a cluster $m_{a',k'}$ in the ground station a'; and $R_{m_{a',k',i \to k}}[x]$ denotes a transmission rate of a signal of the cell-center aircraft k decoded at the aircraft i of the cluster $m_{a',k'}$;

for the cell-edge aircraft k, since the signal of the cell-edge aircraft k participates in an SIC process of three ground stations, the transmission rate of the cell-edge aircraft k may be less than transmission rates of aircrafts decoded later in the corresponding clusters of the all ground stations; $\Phi_{a,k}$ denotes a set of aircrafts in the same cluster as the cell-edge aircraft k in ground station a and whose decoding orders are not earlier than that of the cell-edge aircraft k, and $R_{m_{a,k,i \to k}}[x]$ denotes a transmission rate of the signal of the cell-edge aircraft k decoded at the aircraft i in a cluster $m_{a,k}$, which may be expressed as:

$$R_k[x] = \min_{a \in \{1,2,3\}, i \in \Phi_{a,k}}\{R_{m_{a,k,i \to k}}[x]\} \quad (9)$$

in S3, constructing the Markov decision process model may include a local observation state O, an action A, and a reward function R;

wherein the local observation state O: for multi-agent deep reinforcement learning, each ground station may be regarded as an agent, and local observation state information $o_{a,t}$ of the ground station a at a t-th step is defined as channel state information from the ground station a to each aircraft and a signal interference suffered by each aircraft; $h_{a,n}[x]$ denotes a channel from the ground station a to the aircraft n on the subcarrier x, $I_{a,n}[x]$ denotes a total signal interference intensity suffered by the aircraft n served by the ground station a on the subcarrier x, and the local observation state information $o_{a,t}$ may be expressed as:

$$o_{a,t} = \{h_{a,n}[x], I_{a,n}[x] | x \in \{1, \ldots, X\}, n \in K^C \cup K_a^N\} \quad (10)$$

the action A: ant action $a_{a,t}$ of the ground station a in the t-th step may consist of an analog beamforming matrix of the ground station a and power allocation to each aircraft; since the analog beamforming matrix needs to satisfy the constant modulus constraint, a modulus value of each element in the matrix may be fixed to $1/\sqrt{N}$, so the action A only needs to contain a phase of each element in the analog beamforming matrix, which may be expressed as:

$$a_{a,t} = \{W_{a,A}\} \cup \{p_{a,n}[x] | x \in \{1, \ldots, X\}, n \in K^C \cup K_a^N\} \quad (11)$$

the reward function R: the reward function may consist of a reward for achieving a high transmission rate in the ground station a and a penalty for violating the constraint;

for the optimization problem (7), the constraints C1 and C2 may be satisfied by performing softmax normalization on the power allocation, while the constraints C3 and C4 may be satisfied by normalizing the beamforming; accordingly, considering the constraint C5, when the transmission rate of the aircraft n in the ground station a does not satisfy the minimum transmission rate threshold, a negative penalty may be fed back to an agent represented by the ground station a;

$C_{a,t}$ denotes a count of times the minimum transmission rate constraint of the ground station a is violated in the t-th step, then the reward of the ground station a in the t-th step may be expressed as:

$$r_{a,t} = k_1 \sum_{x=1}^{X} \left( \sum_{k \in K}^{c} R_k[x] + \sum_{a'=1}^{3} \sum_{k' \in K_{a'}^{N}} R_{a',k'}[x] \right) - k_2 C_{a,t} \quad (12)$$

wherein constraint coefficients $k_1$, $k_2$ denote positive constant coefficients, $k_1$ denotes a first coefficient, and $k_2$ denotes a second coefficient.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
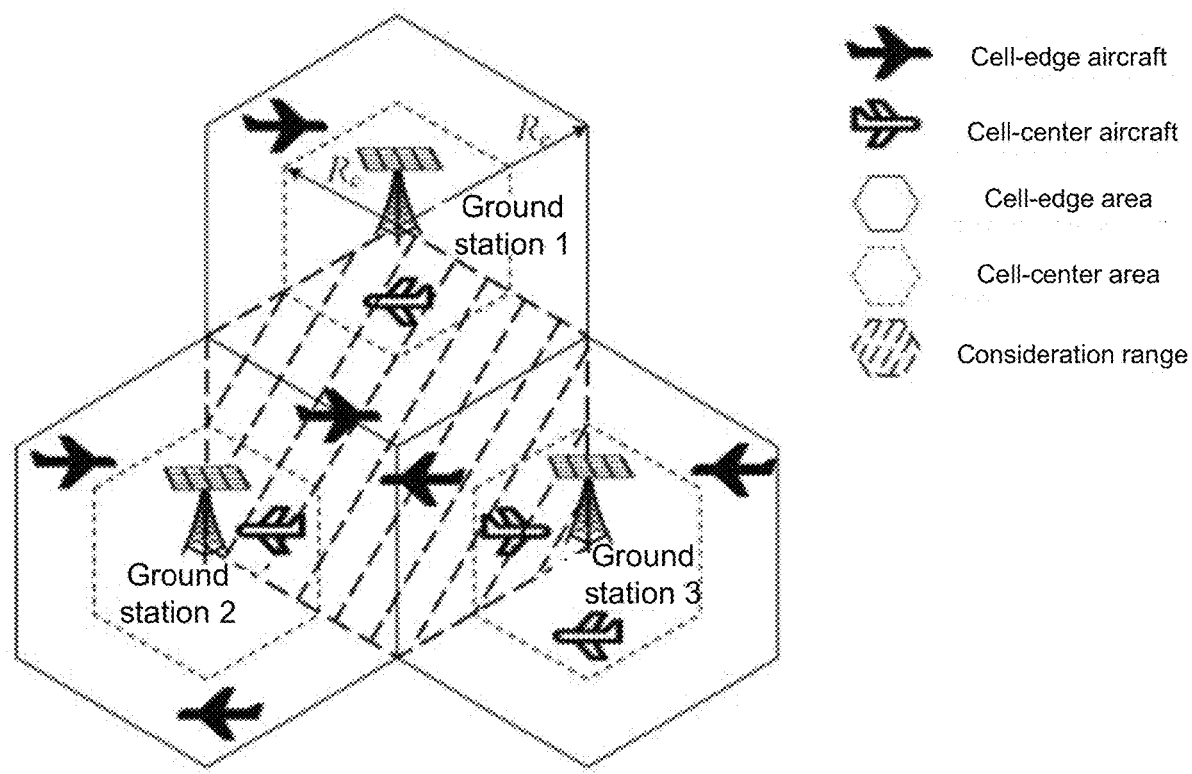
FIG. 1 is a schematic diagram illustrating an exemplary model of a coordinated multiple access system for multi-cell ground-to-air data transmission according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device", "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one", "a", "an", "one kind", and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

FIG. 1 is a schematic diagram illustrating an exemplary model of a coordinated multiple access system for multi-cell ground-to-air data transmission according to some embodiments of the present disclosure.

Embodiment 1

The present disclosure provides a coordinated multiple access method for multi-cell ground-to-air data transmission. The method may be implemented based on a processor. In some embodiments, both an aircraft and a ground station may include a processor. The processor may be configured to process data and/or information obtained from other devices or system components. In some embodiments, the processor may include one or more sub-processors. Merely by way of example, the processor may include a central processing unit (CPU), a graphics processing unit (GPU), an application-specific integrated circuit (ASIC), or the like, or any combination thereof.

In some embodiments, the coordinated multiple access method for multi-cell ground-to-air data transmission may include the following steps:

S1. constructing a model of a coordinated multiple access system for multi-cell ground-to-air data transmission, including constructing a scenario model and constructing a channel model;

S2. calculating a transmission rate of the aircraft within a consideration range, and constructing a multi-cell airspace and power domain resource allocation optimization problem by taking maximizing a system transmission rate as an optimization objective;

S3. constructing a Markov decision process model based on the optimization objective and constraints; and S4. solving the optimization problem using a multi-agent deep reinforcement learning algorithm.

For example, the above steps may be specifically illustrated as follows.

Step 1.

The present disclosure considers a multi-cell ground-to-air communication scenario. In order to achieve seamless coverage, a service range of each cell may be represented by a hexagon, as shown in FIG. 1. Each cell may consist of a cell-center area and a cell-edge area. Side lengths of the cell-center area and the cell-edge area are denoted as Rc and Re, respectively. Three ground stations may be located in the center of the corresponding cell, and may implement backhaul transmission via optical fibers. An aircraft located in the cell-center area may be served by a ground station to which the aircraft belongs, and an aircraft located in the cell-edge area may be served by a plurality of ground stations to implement data transmission simultaneously using a CoMP technology. The CoMP technology may be applied to the multi-cell scenario, such that the interference from neighboring cells can be suppressed and the useful signal strength can be enhanced, thereby solving the problem of poor communication quality when the aircraft is located at the edge of the cell.

The present disclosure considers a scenario of three cells. A shaded area in a central hexagon of FIG. 1 is the "consideration range". The present disclosure aims at the aircrafts in the consideration range, and the remaining areas are similar to the structure of the consideration range. the present disclosure is for the aircraft in the consideration range, and the rest of the area is similar to the structure of the consideration range, so the communication performance may be predicted with reference to the consideration range.

The ground station refers to an intermediate station for communication between the ground and the aircraft for receiving and sending data. In some embodiments, the ground station may include one or more antennas, a radio frequency (RF) front end, a baseband processing unit, and a backhaul link (e.g., an optical fiber).

In some embodiments, one or more antenna arrays may be configured to adjust beamforming and MIMO operation. The RF front end may be configured to support a desired frequency band. The baseband processing unit may be configured to carry out modulation and demodulation of signals, and to perform advanced communication protocols such as CoMP. The backhaul link may be configured to transmit ground station data to other places such as other ground stations, data centers, etc.

The aircraft refers to a vehicle capable of traveling in or through the atmosphere.

In some embodiments, the aircraft may have data processing and storage capabilities to support autonomous flight and data collection.

In some embodiments, the aircraft may be equipped with a necessary communication device for communicating with the ground station. In some embodiments, the communication device may include one or more antennas, an RF transceiver compatible with the ground station, etc. In some embodiments, the communication device may also integrate with a GPS, an IMU, or other feasible computing units for flight control and data processing.

Figure 2:
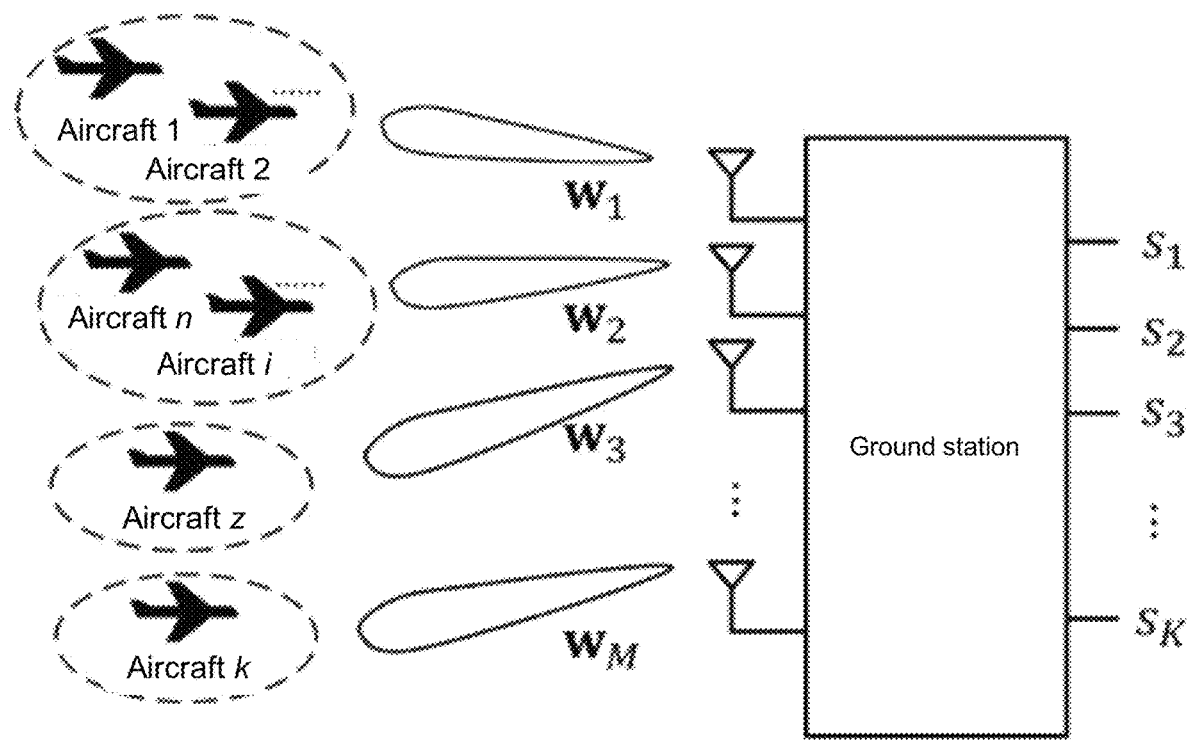
FIG. 2 is a schematic diagram illustrating an exemplary multi-access architecture combining SDMA and NOMA according to some embodiments of the present disclosure.

FIG. 2 is a schematic diagram illustrating an exemplary multi-access architecture combining SDMA and NOMA according to some embodiments of the present disclosure.

In each cell, a ground station may serve a plurality of aircrafts using the multi-access architecture combining the SDMA and the NOMA, as shown in FIG. 2. K indicates that each ground station serves K aircrafts. The aircrafts may be divided into M clusters according to channel correlation, i.e., the aircrafts with strong channel correlation may be divided into one cluster, and the aircrafts with weak channel correlation may be divided into different clusters. The aircrafts in the same cluster may share the same beam. Multi-aircraft signals may be decoded using the NOMA technology, and inter-cluster interference may be eliminated using the SDMA technology, thus realizing adaptive multi-access in each cell. The technical solution that combines the SDMA and the NOMA may improve the spectral efficiency of the ground station for data transmission to the plurality of aircrafts, thereby satisfying the high-capacity demand of aeronautical broadband communication.

In order to reduce the cost of hardware implementation under the premise of guaranteeing the communication performance, the beamforming at the ground station may adopt a hybrid analog and digital beamforming technology. A count of RF of the ground station is denoted as $N_{RF}$.

Each ground station may send signals to a single-antenna aircraft using a horizontally placed uniform planar array antenna. A count of available subcarriers is denoted as X, a total count of planar array antennas is denoted as N, and a transmission bandwidth is denoted as B.

A channel model for aeronautical broadband communication may be constructed based on a Saleh-Valenzuela channel model. A channel of an x-th subcarrier between the ground station and the aircraft may be expressed as:

$$h[x] = \sum_{l=1}^{L} \alpha_l e^{j2\pi f_x \tau_l} a^H(\theta_l, \varphi_l) \qquad (1)$$

wherein L denotes a count of multipaths, $a_l$ denotes a gain of an l-th path, j denotes an imaginary unit, $f_x$ denotes a frequency selective fading coefficient on a subcarrier x, $\tau_l$ denotes an arrival delay of the l-th path, $a(\theta_l, \varphi_l)$ denotes an array steering vector, $\theta_l$ denotes a pitch angle of the aircraft relative to a planar array, $\varphi_l$ denotes an azimuth angle of the aircraft relative to the planar array, and H denotes conjugate transpose of a matrix.

The three ground stations may simultaneously serve a cell-edge aircraft k through CoMP transmission. Let $\alpha \in 1, 2, 3$ denote a ground station index, $h_{a,k}[x]$ denotes a channel response matrix between a ground station a and the cell-edge aircraft k on the subcarrier x, $m_{a,k}$ denotes a cluster of the cell-edge aircraft k in the ground station a, $m_a'$ denotes other clusters in the ground station a, $\mathcal{G}_{m_{a,k}}$ and $\mathcal{G}_{m_a'}$ denote a set of aircrafts in the clusters $m_{a,k}$ and $m_a'$, respectively, $w_{a,m_{a,k}}[x]$ and $w_{a,m_a'}[x]$ denote hybrid beamforming vectors of the ground station a for the clusters $m_{a,k}$ and $m_a'$ on the subcarrier x, respectively, $p_{a,k}[x]$, $p_{a,i}[x]$, and $p_{a,n}[x]$ denote power allocation variables of the ground station a for aircrafts k, i, n on the subcarrier x, respectively, $s_k[x]$, $s_i[x]$, and $s_n[x]$ denote signals received by the aircrafts k, i, n on the subcarrier x, respectively, and $n_k[x]$ denotes noise of the cell-edge aircraft k on the subcarrier x.

The signal $y_k[x]$ received by the cell-edge aircraft k on the subcarrier x may be expressed as:

$$y_k[x] = \underbrace{\sum_{a=1}^{3} h_{a,k}[x] w_{a,m_{a,k}}[x] \sqrt{p_{a,k}[x]} s_k[x]}_{\text{useful signal}} + \qquad (2)$$

$$\underbrace{\sum_{a=1}^{3} \sum_{i \neq k, i \in \mathcal{G}_{m_{a,k}}} h_{a,k}[x] w_{a,m_{a,k}}[x] \sqrt{p_{a,i}[x]} s_i[x]}_{\text{Intra-cluster interference}} +$$

$$\underbrace{\sum_{a=1}^{3} \sum_{m_a' \neq m_{a,k}, n \in \mathcal{G}_{m_a'}} h_{a,k}[x] w_{a,m_a'}[x] \sqrt{p_{a,n}[x]} s_n[x]}_{\text{inter-cluster interference}} + n_k[x]$$

Assuming considering a scenario of coherent joint transmission (CJT) based on an ideal backhaul capacity, real-time channel state information may be shared among the ground stations. A capacity gain may be obtained by coherent merging of multipath signals at the cell-edge aircraft k, and power $p_{desired}$ of a received useful signal may be a power of a sum of the useful signals from all the ground stations, which may be expressed as:

$$P_{desired} = \left|\sum_{a=1}^{3} h_{a,k}[x] w_{a,m_{a,k}}[x] \sqrt{p_{a,k}[x]}\right|^2 \quad (3)$$

In the CJT scenario, the signal of the cell-edge aircraft at any aircraft may consist of the sum of the signals from the three ground stations. It is difficult for the power allocation of a single ground station to ensure more power for the cell-center aircraft. In this case, more power may be allocated to the cell-edge aircraft and priority may be given to decoding. Meanwhile, receiving signals from a plurality of ground stations results may make it easier for the channels between the cell-edge aircrafts to be strongly correlated, such that all the cell-edge aircrafts may be grouped into the same cluster and decoded using NOMA. In addition, different aircrafts may have different SIC orders at different ground stations, increasing the receiver complexity of NOMA and requiring a complex scheduling algorithm. To this end, it is assumed that the SIC decoding orders of the aircrafts at different ground stations are the same.

A signal interference received by a cell-center aircraft k' served by a ground station a' may include a signal interference from the cell-edge aircraft, and a signal interference from the cell-center aircraft of a current cell and neighboring cells. $K^C$ denotes a set of the cell-edge aircrafts, $K_a'^N$ and $K_a^N$ denote a set of cell-center aircrafts served by the ground station a' and a set of cell-center aircrafts served by the ground station a, respectively, $h_{a',k'}[x]$ and $h_{a,k}[x]$ denote channels from the ground station a' and the ground station a to the cell-center aircraft k' on the subcarrier x, respectively, $p_{a',k'}[x]$ and $p_{a,k}[x]$ denote power allocation variables of the ground station a' to the aircrafts k' and i on the subcarrier x, respectively, $s_{k'}[x]$ denotes a signal received by the cell-center aircraft k' on the subcarrier x, $m_{a',k'}$ and $m_{a',i}$ denote clusters of the aircrafts k' and i in the ground station a', respectively, $m_{a,k}$ and $m_{a,n}$ denote the clusters of the aircrafts k and n in the ground station a, respectively, $w_{a,m_{a,k}}[x]$ and $w_{a,m_{a,n}}[x]$ respectively denote hybrid beamforming vectors of the ground station a' on subcarrier x for the clusters $m_{a',k'}$ and $m_{a',i}$; $w_{a,m_{a,k}}[x]$ and $w_{a,m_{a,n}}[x]$ denote the hybrid beamforming vectors of the ground station a on the subcarrier x for the clusters $m_{a,k}$ and $m_{a,n}$, respectively; $n_{k'}[x]$ denotes noise of the cell-center aircraft k' on the subcarrier x, and the signal received by the cell-center aircraft k' served by the ground station a' on the subcarrier x may be expressed as:

$$y_{a',k'}[x] = \underbrace{h_{a',k'}[x] w_{a',m_{a',k'}}[x] \sqrt{p_{a',k'}[x]} s_{k'}[x]}_{\text{useful signal}} + \quad (4)$$

$$n_{k'}[x] + \underbrace{\sum_{k \in K^C} \sum_{a=1}^{3} h_{a,k'}[x] w_{a,k}[x] \sqrt{p_{a,k}[x]} s_k[x]}_{\text{signal interference from the cell-edge aircrafts}} +$$

$$\underbrace{\sum_{i \in K_{a'}^N, i \neq k^N} h_{a',k'}[x] w_{a,m_{a',i}}[x] \sqrt{p_{a',i}[x]} s_i[x]}_{\text{signal interference from theh cell-center aircraft of the current cell}} +$$

$$\underbrace{\sum_{a \neq a'} \sum_{n \in K_a^N} h_{a,k'}[x] w_{a,m_{a,n}}[x] \sqrt{p_{a,n}[x]} s_n[x]}_{\text{signal interference from cell-center aircrafts of neighboring cells}}$$

Step 2.

The calculating a transmission rate of the aircraft, and constructing a multi-cell airspace and power domain resource allocation optimization problem by taking maximizing a system transmission rate as an optimization objective may include the following steps.

S21, a transmission rate of the cell-edge aircraft k may be calculated.

$a_{k,i}^{m_{a,k}}$ denotes an SIC decoding order of the cell-edge aircraft k and the aircraft i of the cluster $m_{a,k}$ in the ground station a, $a_{k,i}^{m_{a,k}}=0$ means that a receiver of the cell-edge aircraft k of the cluster $m_{a,k}$ first decodes the signal of the aircraft i and eliminates the signal using an SIC technology; otherwise, $a_{k,i}^{m_{a,k}}=1$ means that the receiver of the cell-edge aircraft k of the cluster $m_{a,k}$ first decodes the signal of the cell-edge aircraft k. Accordingly, it is deduced that the transmission rate $R_k[x]$ between the ground station a and the cell-edge aircraft k on the subcarrier x may be expressed as:

$$R_k[x] = B\log_2\left(1 + \frac{P_{desired}}{I_C + I_N + \sigma_k^2}\right) \quad (5)$$

$$I_C = \sum_{i \neq k, i \in K^C} \sum_{a=1}^{3} \alpha_{k,i}^{m_{a,k}}[x] |h_{a,k}[x] w_{a,m_{a,i}}[x] \sqrt{p_{a,i}[x]}|^2$$

$$I_N = \sum_{a=1}^{3} \sum_{n \in K_a^N} |h_{a,k}[x] w_{a,m_{a,n}}[x]|^2 p_{a,n}[x]$$

wherein $I_C$ denotes a signal interference of other cell-edge aircrafts except the cell-edge aircraft k, $I_N$ denotes the signal interference of the cell-center aircraft, $\sigma_k^2$ denotes noise power; and $w_{a,m_{a,i}}[x]$ denotes a hybrid beamforming vector of the ground station a for the cluster $m_{a,i}$ on the subcarrier x.

S22, a transmission rate of the cell-center aircraft k' may be calculated.

The transmission rate $R_{a,k'}[x]$ of the cell-center aircraft k' served by the ground station a' may be expressed as:

$$R_{a,k'}[x] = B\log_2\left(1 + \frac{|h_{a',k'}[x] w_{a',m_{a',k'}}[x]|^2 p_{a',k'}[x]}{ICI_C + INI_N + ICI_N + ICI_{cell} + \sigma_{k'}^2}\right) \quad (6)$$

$$ICI_C = \sum_{k \in \{K^C - \mathcal{G}_{m_{a',k'}}\}} \sum_{a=1}^{3} |h_{a,k}[x] w_{a,m_{a,k}}[x] \sqrt{p_{a,k}[x]}|^2$$

$$INI_N = \sum_{z \neq k', z \in \mathcal{G}_{m_{a',k'}}} \alpha_{k',z}^{m_{a',k'}}[x] |h_{a',k'}[x] w_{a,m_{a',k'}}[x]|^2 p_{a',z}[x]$$

$$ICI_N = \sum_{i \in \{K_{a'}^N - \mathcal{G}_{m',k'}\}} |h_{a',k'}[x] w_{a',m_{a',i}}[x]|^2 p_{a',i}[x]$$

$$ICI_{cell} = \sum_{a \neq a'} \sum_{n \in K_a^N} |h_{a,k'}[x] w_{a,m_{a,n}}[x]|^2 p_{a,n}[x]$$

wherein $ICI_C$ denotes an inter-cluster interference to the cell-center aircraft k' from the cell-edge aircraft, and $ICI_C$ may be 0 if the cell-center aircraft k' and the cell-edge aircraft are in the same cluster; $INI_N$ and $ICI_N$ denote signal interferences of the cell-center aircrafts in the same cluster and different clusters as the cell-center aircraft k' in the ground station a', respectively; $ICI_{cell}$ denotes inter-cell signal interferences caused by cell-center aircrafts served by neighboring ground stations; $\mathcal{G}_{m_{a',k'}}$ denotes a set of aircrafts in a cluster $m_{a',k'}$, $p_{a',z}[x]$ denotes a power allocation variable of the ground station a' to an aircraft z on the subcarrier x, $a_{k',z}^{m_{a',k'}}$ denotes an SIC decoding order of the cell-edge aircraft k' and the aircraft z of the cluster $m_{a',k'}$ in the ground station a'; and ok, denotes noise power of the aircraft k'.

S23, a multi-cell joint transmission resource allocation optimization problem may be constructed.

The optimization variables refer to transmission power of each ground station to each aircraft and a hybrid analog and digital beamforming vector for each cluster. P denotes total power that each ground station can allocate to the aircraft on each $\mathcal{F}$ subcarrier, $W_{a,A}$ denotes an analog beamforming matrix of the ground station a, $\mathcal{F}$ denotes all elements in $W_{a,A}$, $W_{a,A}(c_x, c_y)$ denotes elements at coordinates $(c_x, c_y)$ in the matrix $W_{a,A}$, $w_{a,D,m_{a,n}}[x]$ denotes a digital beamforming vector of the ground station a for a cluster $m_{a,n}$ on the subcarrier x, which satisfies $w_{a,m_{a,n}}[x] = W_{a,A} \times w_{a,D,m_{a,n}}[x]$, $R_n[x]$ denotes a transmission rate of an aircraft n on the subcarrier x, $R_n^{thr}[x]$ denotes a minimum transmission rate threshold of the aircraft n. Constructing the multi-cell joint transmission resource allocation optimization problem may be expressed as follows:

$$\max_{\{W_{a,A}, w_{a,D,m_{a,n}}[x], p_{a,n}[x]\}} \sum_{x=1}^{X} \left( \sum_{k \in K} cR_k[x] + \sum_{a'=1}^{3} \sum_{k' \in K_{a'}^N} R_{a',k'}[x] \right) \quad (7)$$

$$C1: \sum_{n \in \{K^C \cup K_a^N\}} p_{a,n}[x] \leq P, \ \forall a, x$$

$$C2: p_{a,n}[x] \geq 0, \ \forall a, n, x$$

$$C3: |W_{a,A} w_{a,D,m_{a,n}}[x]| = 1, \ \forall a, m_{a,n}, x$$

$$C4: |W_{a,A}(c_x, c_y)| = \frac{1}{\sqrt{N}}, \ \forall a, (c_x, c_y) \in F$$

$$C5: R_n[x] \geq R_n^{thr}[x], \ \forall x, a, n \in \{K^C \cup K_a^N\}$$

wherein a constraint C1 denotes a maximum transmission power limit of the ground station; a constraint C2 denotes a non-negative value constraint of power; a constraint C3 denotes a normalization constraint of the hybrid beamforming vector of the ground station; a constraint C4 denotes a constant modulus constraint of elements in an analog beamforming matrix; and a constraint C5 denotes a minimum transmission rate constraint of the aircraft n.

In order to correctly implement SIC decoding at the aircraft, a minimum value of the transmission rate of the cell-center aircraft k' served by the ground station a' at an aircraft of which a decoding order is later than the decoding order of the cell-center aircraft k' may be taken as the transmission rate of the cell-center aircraft k', which may be expressed as:

$$R_{a',k'}[x] = \min_{i \in \Phi_{a',k'}} \{R_{m_{a',k'},i \to k'}[x]\} \quad (8)$$

wherein $\Phi_{a',k'}$ denotes a set of aircrafts in the same cluster as the cell-center aircraft k' in the ground station a' and whose decoding orders are not earlier than that of the cell-center aircraft k', i.e., $\Phi_{a',k'} = \{i | \alpha_{i,k'}^{m_{a',k'}}[x] = 0\} \cup \{k'\}$, wherein $\alpha_{i,k'}^{m_{a',k'}}[x]$ denotes an SIC decoding order of the cell-center aircraft k' and an aircraft i of a cluster $m_{a',k'}$ in the ground station a'; and $R_{m_{a',k'},i \to k'}[x]$ denotes a transmission rate of a signal of the cell-center aircraft k' decoded at the aircraft i of the cluster $m_{a',k'}$.

For the cell-edge aircraft k, since the signal of the cell-edge aircraft k participates in an SIC process of three ground stations, the transmission rate of the cell-edge aircraft k may be less than transmission rates of aircrafts decoded later in the corresponding clusters of the all ground stations. $\Phi_{a,k}$ denotes a set of aircrafts in the same cluster as the cell-edge aircraft k in ground station a and whose decoding orders are not earlier than that of the cell-edge aircraft k, and $R_{m_{a,k},i \to k}[x]$ denotes a transmission rate of the signal of the cell-edge aircraft k decoded at the aircraft i in a cluster $m_{a,k}$, which may be expressed as:

$$R_k[x] = \min_{a \in \{1,2,3\}, i \in \Phi_{a,k}} \{R_{m_{a,k},i \to k}[x]\} \quad (9)$$

Step 3.

A Markov decision process model may be constructed, including a local observation state O, an action A, a reward function R, a state transfer probability matrix P, and a discount factor γ.

The local observation state O: for multi-agent deep reinforcement learning, each ground station may be regarded as an agent, and local observation state information $o_{a,t}$ of the ground station a at a t-th step may be defined as channel state information from the ground station a to each aircraft and a signal interference suffered by each aircraft. $h_{a,n}[x]$ denotes a channel from the ground station a to the aircraft n on the subcarrier x, $I_{a,n}[x]$ denotes a total signal interference intensity suffered by the aircraft n served by the ground station a on the subcarrier x, and the local observation state information $o_{a,t}$ may be expressed as:

$$o_{a,t} = \{h_{a,n}[x], I_{a,n}[x] | x \in \{1, \ldots, X\}, n \in K^C \cup K_a^N\} \quad (10)$$

The action A: considering the problem of too large action space caused by solving beamforming and power allocation using deep reinforcement learning, the digital beamforming matrix of each ground station may be solved using an approximate zero forcing algorithm, and the power allocation and the analog beamforming matrix may be solved using reinforcement learning, thereby greatly reducing the action space of deep reinforcement learning, accelerating the training speed and improving the convergence performance. An action $a_{a,t}$ of the ground station a in the t-th step may consist of the analog beamforming matrix of the ground station a and power allocation to each aircraft. Since the analog beamforming matrix needs to satisfy the constant modulus constraint, a modulus value of each element in the matrix is fixed to $1/\sqrt{N}$, so the action A only needs to contain a phase of each element in the analog beamforming matrix, which may be expressed as:

$$a_{a,t} = \{W_{a,A}\} \cup \{p_{a,n}[x] | x \in \{1, \ldots, X\}, n \in K^C \cup K_a^N\} \quad (11)$$

The reward function R: the reward function may consist a reward for achieving a high transmission rate in the ground station a and a penalty for violating the constraint.

For the optimization problem (7), the constraints C1 and C2 may be satisfied by performing softmax normalization on the power allocation, while the constraints C3 and C4 may be satisfied by normalizing the beamforming. Accordingly, considering the constraint C5, when the transmission rate of the aircraft n in the ground station a does not satisfy the minimum transmission rate threshold, the processor may feed back a negative penalty to an agent represented by the ground station a.

$C_{a,t}$ denotes a count of times the minimum transmission rate constraint of the ground station a is violated in the t-th step, then the reward of the ground station a in the t-th step may be expressed as:

$$r_{a,t} = k_1 \sum_{x=1}^{X} \left( \sum_{k \in K^C} R_k[x] + \sum_{a'=1}^{3} \sum_{k' \in K_{a'}^N} R_{a',k'}[x] \right) - k_2 C_{a,t} \quad (12)$$

wherein the constraint coefficients $k_1$, $k_2$ denote positive constant coefficients, $k_1$ denote a first coefficient, and $k_2$ denotes a second coefficient.

In order to simplify the model, the state transfer probability matrix P may be set as that the local observation state information $o_{a,t}$ of step t is transferred to the local observation state information $o_{a,t+1}$ of step t+1 according to a probability 1; and the discount factor γ may be set as a constant between 0 and 1. The larger γ, the more the agent values the long-term reward that can be obtained in the future, and the smaller γ, the more the agent values the reward that can be obtained at present.

Considering the high complexity of the optimization problem due to the high degree of coupling between the optimization variables, and the high timeliness demand of the high speed movement for the algorithm, by constructing the Markov decision process model of the optimization problem and solving by using multi-agent reinforcement learning, fast online decision can be implemented a low-complexity way.

Step 4.

The present disclosure solves the joint optimization problem using multi-agent deep reinforcement learning. The deep reinforcement learning method is not unique. This embodiment solves the optimization problem by taking a multi-agent proximal policy optimization (MAPPO) algorithm as an example.

Figure 3:
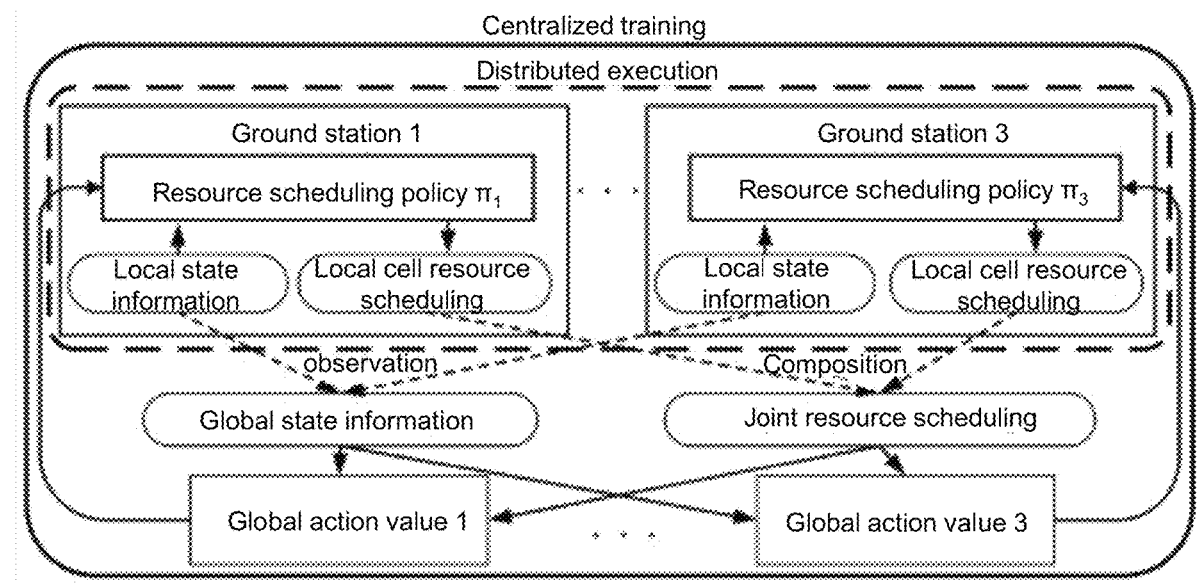
FIG. 3 is a block diagram illustrating an exemplary algorithm in general according to some embodiments of the present disclosure.

FIG. 3 is a block diagram illustrating an exemplary algorithm in general according to some embodiments of the present disclosure.

As shown in FIG. 3, the MAPPO algorithm may use a centralized training and distributed execution mechanism. Each ground station may obtain a resource scheduling action of the cell by inputting state information of local observation into a policy neural network. Meanwhile, a global action value may be obtained by inputting global state information of the three cells and joint resource scheduling into an evaluation neural network. The parameters of the neural network may be trained and updated using stochastic gradient descent until a final optimal polity is obtained, so as to be applied in different scenarios.

Since both analog and digital beamforming in the optimization variables are beamforming for clusters, the aircrafts may be clustered before solving the beamforming. Since all cell-edge aircrafts need to be divided into the same cluster in each ground station, the K-means algorithm may not be directly used to cluster the aircrafts. To this end, the processor may first select a cluster head of each cluster according to the channel strength, and then divide the remaining aircrafts into each cluster according to channel correlation.

In some embodiments, the solving process may be divided into two steps: an algorithm training process and an algorithm application process. For example, the specific solving process may be as follows.

(1) the Algorithm Training Process

Figure 4:
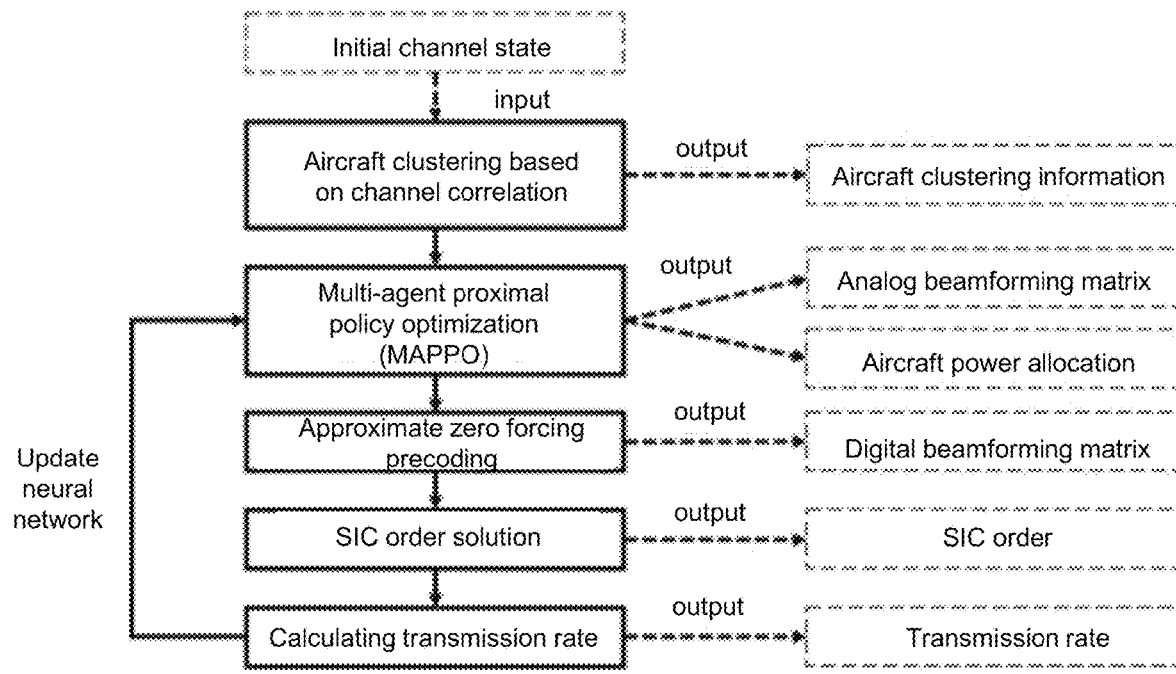
FIG. 4 is a flowchart illustrating an exemplary process of algorithm training according to some embodiments of the present disclosure.

FIG. 4 is a flowchart illustrating an exemplary process of algorithm training according to some embodiments of the present disclosure.

As shown in FIG. 4, during the algorithm training process, a processor may solve a hybrid beamforming matrix and power allocation variables of each ground station using the MAPPO algorithm in combination with an approximate zero forcing precoding algorithm, and continuously update each neural network by taking maximizing a system transmission rate as an optimization objective, and ultimately enable the agent to learn a policy that can obtain a maximum long-term reward. For example, the steps may be as follows.

A1, each neural network may be initialized.

A2, channel information from each ground station to each aircraft may be initialized, and an experience playback pool may be cleared.

A3, each aircraft may be clustered at each ground station by channel correlation as follows:
a) first, cell-edge aircrafts may be grouped into a cluster and the whole of the cell-edge aircrafts may be used as a cluster head of the cluster;
b) then the channel correlation between cell-center aircrafts served by the cell and all the cluster heads in that cell may be calculated. The channel correlation between the cell-edge aircraft k and the aircraft i within the cell a may be defined as:

$$C_{k,i} = \frac{1}{X}\sum_{x=1}^{X} \frac{|h_{a,k}[x] \times h_{a,i}[x]^H|}{\|h_{a,k}[x]\| \, \|h_{a,i}[x]\|} \tag{13}$$

c) given a channel correlation threshold, cell-center aircrafts of which channel correlations with all the cluster heads are less than the threshold may form a candidate set, and an aircraft with a largest channel gain may be selected from the candidate set as a new cluster head. If the candidate set is empty, the threshold may be increased until at least one aircraft exists in the candidate set;
d) the steps b and c may be repeated until M cluster heads are selected;
e) finally, for all non-cluster head cell-center aircrafts, the channel correlation between all the cluster heads in the cell and the aircraft may be calculated, and the aircraft may be divided into a cluster where a cluster head has the largest channel correlation with aircraft.

A4, each ground station may obtain the current local observation state information $o_{a,t}$. $o_{a,t}$ may be used as an input of the neural network, and the action $o_{a,t}$ of each agent may be output, i.e., power allocation and an analog beamforming matrix of the ground station to each aircraft.

A5, a digital beam assignment matrix of the ground station to each cluster may be calculated by an approximate zero forcing algorithm as follows:
a) first an equivalent channel $\bar{h}_{a,k}[x]=h_{a,k}[x]\times W_{a,A}$ of each aircraft may be calculated;
b) the highest equivalent channel gain in each cluster may be taken as an equivalent channel of the cluster, i.e.:

$$\bar{h}_{a,m}^c[x] = \underset{\bar{h}_{a,k}[x], k\in G_m}{\mathrm{argmax}} \; \|\bar{h}_{a,k}[x]\| \tag{14}$$

c) an equivalent channel matrix from the cell a to each cluster may be calculated:

$$\bar{H}_a[x] = \left[\bar{h}_{a,1}^c[x], \ldots, \bar{h}_{a,M}^c[x]\right]^T \in \mathbb{C}^{M\times N_{RF}} \tag{15}$$

d) an unnormalized digital beamforming matrix may be obtained by performing inversion of the equivalent channel matrix:

$$\tilde{W}_{a,D}[x]=[\tilde{w}_{a,D,1}[x], \ldots, \tilde{w}_{a,D,M}[x]]=(\bar{H}_a[x])^\dagger \in \mathbb{C}^{N_{RF}\times M} \tag{16}$$

e) finally the digital beamforming vector may be obtained by normalizing the column vectors therein:

$$w_{a,D,m}[x] = \frac{\tilde{w}_{a,D,m}[x]}{\|W_{a,A} \times \tilde{w}_{a,D,m}[x]\|} \quad (17)$$

A6, an effective channel may be calculated from the hybrid beamforming matrix and an original channel, and an SIC order may be determined according to the principle that the aircraft with the small effective channel gain is decoded first. The effective channel of the cell-edge aircraft k is denoted as $$\bar{h}_{a,k}^e[x] = \sum_{a=1}^{3} h_{a,k}[x] W_{a,A} w_{a,D,m_{a,k}}[x] \in \mathbb{C}$$

The effective channel of the cell-edge aircraft k served by the ground station a is denoted as $\bar{h}_{a,k}^e[x] = h_{a,k}[x] W_{a,A} W_{a,D,m_{a,k}}[x]$. When $|\bar{h}_{a,k}^e[x]|^2 > |\bar{h}_{a,i}^e[x]|^2$, $a_{k,i}^{m_{a,k}}[x]=0$; otherwise $a_{k,i}^{m_{a,k}}[x]=1$.

A7, the system transmission rate may be calculated from the hybrid beamforming matrix and a power allocation result, a count of constraint violations may be calculated, a reward function $r_{a,t}$ may be given, and the environment may be updated to a state $o_{a,t+1}$ in the next step, and finally sample data ($o_{a,t}$, $a_{a,t}$, $r_{a,t}$, $o_{a,t+1}$) of the step may be stored into an experience playback pool.

A8, the steps A4-A7 may be repeated until the experience playback pool is stored full, then a loss function may be calculated from the sample data in the experience playback pool, and the parameters of the neural network may be trained and updated using stochastic gradient descent.

A9, whether the training is enough times, i.e., whether enough steps are performed, may be determined, if the determination result is yes, the training may be ended; if the determination result is no, the steps A2-A8 may be repeated.

(2) The Algorithm Application Process.

The application process may not need to update the neural network, and may directly utilize the channel information in different environments to quickly solve the allocation power and the hybrid beamforming matrix to each aircraft corresponding to each ground station. The specific steps may be as follows:

B1, the aircrafts may be divided into clusters at each ground station by channel correlation in the same way as the step A3 of the training process.

B2, each ground station may obtain current local observation state information, and use the current local observation state information as an input of neural network, and the power allocation and the analog beamforming matrix of the ground station to each aircraft may be output.

B3, the digital beamforming matrix of the ground station to each cluster may be solved by the approximate zero forcing algorithm in the same way as in the step A5 of the training process.

B4, the effective channel may be calculated from the hybrid beamforming matrix and the original channel, and the SIC order may be determined according to the principle that the aircraft with the small effective channel gain is decoded first. To this point, the allocation of airspace and power domain resources in the current environment may be completed, each aircraft is able to decode the useful signals according to this SIC order, and the application process may be ended.

In some embodiments of the present disclosure, by adopting the above coordinated multiple access method for multi-cell ground-to-air data transmission, rapid allocation of online airspace and power domain resources may be carried out based on the local observation information of each ground station, maximizing the system transmission rate under the condition of guaranteeing that the aircraft can correctly decode signals and meet the minimum transmission rate constraint, and solving the problem of poor communication quality when the aircraft is located at the edge of the cell, thereby realizing high-speed transmission of the ground-to-air data under the high dynamic scenario of aircraft flight.

Finally, it should be noted that the above embodiments are only used to illustrate the technical solutions of the present disclosure rather than to limit them, and although the present disclosure has been described in detail with reference to the preferred embodiments, those having ordinary skills in the art should understand that it is still possible to perform modifications or equivalent replacements to the technical solution of the present disclosure. Such modifications or equivalent replacements do not make the modified technical solution deviate from the spirit and scope of the technical solution of the present disclosure.

In some embodiments, the coordinated multiple access method for multi-cell ground-to-air data transmission may further comprise a step 5. The step 5 may comprise the following steps: generating a ground configuration instruction based on multi-cell airspace allocation parameters and power domain resource allocation optimization parameters obtained by solving the optimization problem in the step S4, and sending the ground configuration instruction to the corresponding ground station to control the ground station to adjust ground communication configuration of the ground station based on the ground configuration instruction.

The ground configuration instruction refers to an instruction used to instruct the ground station to perform configuration adjustment.

In some embodiments, the processor may generate the ground configuration instruction based on the multi-cell airspace allocation parameters, and the power domain allocation optimization parameters obtained by solving the optimization problem in various ways. For example, the processor may generate the corresponding ground configuration instruction based on the multi-cell airspace allocation parameters and the power domain allocation optimization parameters by querying a first preset table.

The first preset table refers to a preset table including the correspondence between the multi-cell airspace allocation parameters, the power domain allocation optimization parameters, and the ground configuration instruction, and may be preset by a technician based on historical experience.

The ground communication configuration refers to a collection of various technical parameters and operation settings used by the ground station to conduct wireless communication. For example, the ground communication configuration may include beamforming configuration, power allocation, a multi-access technology selection, and coordinated transmission configuration.

In some embodiments, the ground station may adjust the ground communication configuration based on the ground configuration instruction by adjusting the beamforming, the power allocation, the multi-access technology selection, and the coordinated transmission configuration.

For example, the ground station may adjust a beamforming vector of an antenna array of the ground station to point at a specific aircraft based on the allocated airspace resources.

As another example, the ground station may adjust the transmission power according to the power domain resource allocation optimization parameters based on the corresponding ground configuration instruction, ensuring that energy consumption is minimized and excessive interference is avoided while the quality of service (QoS) requirements are met (e.g., above the minimum transmission rate).

As another example, the ground station may select to use SDMA, NOMA, or other multi-access technologies based on a resource allocation policy to support communication in high-density or multi-user scenarios.

As another example, in a multi-cell cooperative scenario, the ground station may cooperate with other base stations based on the ground configuration instruction corresponding to the multi-cell airspace allocation parameters, and jointly transmit data through the CoMP technology, improving the experience of users located at the edge of the cell.

In some embodiments of the present disclosure, by generating the ground configuration instruction to adjust the ground communication configuration based on the result obtained from solving the optimization problem, the interference to other users may be reduced, and the strength of the received signal of the target user may be enhanced. Communication in the high-density or multi-user scenario may be facilitated, which in turn improves the experience of the users located at the edge of the cell.

In some embodiments, the coordinated multiple access method for multi-cell ground-to-air data transmission may further comprise a step 6. The step 6 may include the following steps: generating an aviation configuration instruction based on multi-cell airspace allocation parameters and power domain resource allocation optimization parameters obtained by solving the optimization problem in the step S4, and sending the aviation configuration instruction to the corresponding aircraft to control the aircraft to adjust aviation communication configuration of the aircraft based on the aviation configuration instruction.

The aviation configuration instruction refers to an adjustment instruction used to instruct the configuration of the aircraft.

In some embodiments, the processor may generate the aviation configuration instruction based on the multi-cell airspace allocation parameters and the power domain resource allocation optimization parameter in various ways. For example, the first preset table may also include the aviation configuration instruction. The processor may generate the corresponding aviation configuration instruction based on the multi-cell airspace allocation parameters and the power domain allocation optimization parameters by querying the first preset table.

The aviation communication configuration refers to a collection of various technical parameters and operation settings required for the aircraft during communication. For example, the aviation communication configuration may include receiving signal configuration, interference suppression configuration, and rate adaptation.

In some embodiments, the aircraft may adjust the aviation communication configuration by adjusting the receiving signal configuration, the interference suppression configuration, the rate adaptation, or the like, based on the aviation communication configuration instruction.

For example, the aircraft may adjust receiver parameters of the aircraft based on the aviation configuration instruction according to beamforming and power settings of the ground station.

The interference suppression configuration refers to a setting used to eliminate interference from other users.

The rate adaptation refers to that the aircraft adjusts the data transmission rate of the aircraft based on allocated resources and channel conditions.

In some embodiments of the present disclosure, by generating the aviation configuration instruction to adjust the aviation communication configuration based on result obtained by solving the optimization problem, signal decoding and data recovery may be optimized, and allocated resources may be fully utilized.

In some embodiments, the step 3 may further include the following steps: acquiring historical observation data, geographical parameter data, and environmental sensing data; determining geographical obstruction based on the geographical parameter data and the environmental sensing data; determining a scenario stability sequence in a future time period through a stability determination model based on the historical observation data and the geographical obstruction; and determining a discount factor sequence in the future time period based on the scenario stability sequence.

In some embodiments, the aircraft may also be configured with an environmental sensor.

The environmental sensor refers to a component used to monitor an environment surrounding the aircraft. For example, the environmental sensor may include a temperature sensor, a humidity sensor, or the like. In some embodiments, the environmental sensor may be configured to collect the environmental sensing data.

The environmental sensing data refers to data obtained by the environmental sensor about the environment surrounding the aircraft. For example, the environmental sensing data may include temperature data, humidity data, or the like.

The historical observation data refers to aviation-related data recorded during navigation in a preset historical time period prior to the current moment. For example, the historical observation data may include a movement speed of the aircraft, a change in the channel, interference data, a change in a user device, and so on, during the preset historical time period. The user device refers to a device of the user capable of receiving signals from a cell signal station, such as a mobile phone, etc.

The change in the channel refers to a set of data reflecting the change in the channel during the preset historical time period. For example, the change in the channel may include a transmission rate, a channel bandwidth, a count of channels, a channel capacity, a count of multipaths, channel state information, a frequency selective fading coefficient, or the like, at a plurality of time points during the preset historical time period. More descriptions regarding the transmission rate, the count of multipaths, and the frequency selective fading coefficient may be found in the steps 1-2 of Embodiment 1.

The interference data refers to data reflecting the interference experienced by each aircraft when signals are received. In some embodiments, the interference data may include signal interference from the cell-edge aircrafts, and signal interference from the cell-center aircrafts of the current cell and the neighboring cells. More descriptions regarding the interference data may be found in the related descriptions of the step 1 of Embodiment 1.

The channel bandwidth refers to available spectral resources of the channel. In some embodiments, the channel bandwidth may affect the transmission rate and the quality of communication.

The channel capacity refers to a maximum data transmission rate that the channel can carry.

The channel state information refers to relevant parameters reflecting the state of the channel. For example, the channel state information may include parameters such as a channel gain, array guiding vectors, delay, or the like. More descriptions may be found in the related descriptions of the step 1 of Embodiment 1.

The geographical parameter data refers to data related to geographical information that reflects the current application scenario. For example, the geographical parameter data may include topographic and geomorphic features, land cover types, land use classification, building distribution data, etc. The topographic and geomorphic features may include mountain ranges, buildings, forests, etc. The land cover types may include forests, grasslands, bodies of water, exposed surfaces, glaciers, etc. The land use classification may include residential areas, industrial areas, agricultural land, parks, etc.

The building distribution data refers to data related to the distribution of buildings. For example, the building distribution data may include types, height, density, and distribution of the buildings (e.g., storied houses, roads, bridges, tunnels, etc.).

In some embodiments, the processor may obtain the building distribution data by reading map data of a region corresponding to the current application scenario.

The geographical obstruction characterizes a degree of influence of the geographical features of the aircraft within the consideration range on the communication process. More descriptions regarding the consideration range may be found in the related descriptions of FIG. 1.

In some embodiments, the processor may construct an obstruction feature vector based on the geographical parameter data, the environmental sensing data, a navigational altitude, and an aircraft model, and a geographical obstruction label corresponding to a reference vector with the highest similarity may be determined as the geographical obstruction by matching in a vector database based on the obstruction feature vector. The similarity may be calculated based on the cosine distance, the Euclidean distance, and so on. The reason for adding the aircraft model in the obstruction feature vector is that different models of aircrafts have different ability to resist interference, and thus the degree of influence caused by the geographic features on the aircraft is also different.

The vector database may include a plurality of reference vectors and a plurality of geographical obstruction labels corresponding to the plurality of reference vectors. The plurality of reference vectors may include a large number of combinations of actual geographical parameter data, environmental sensing data, average navigational altitude, and aircraft models, covering records of communication transmission effects under various geographical environments and weather conditions.

For example, the processor may obtain the geographical parameter data based on map data actually captured by the aircraft, or map software. As another example, the aircraft may be the dispatched to carry out experimental signal transmission. In this case, the processor may collect the environmental sensing data through the environmental sensor, and record the average navigational altitude of the aircraft, the aircraft model, or the like.

In some embodiments, when the above data is acquired, the processor may also acquire a signal interference situation (e.g., signal strength loss, delay, packet loss rate, noise, etc.) of the received experimental signal recorded by the ground station and score the signal interference situation as the corresponding geographical obstruction label. For example, the processor may score the signal interference situation based on a preset rule. For example, the preset rule may be that the higher the signal strength loss, the higher the delay, the higher the packet loss, and the higher the noise, the higher the score.

In some embodiments, the processor may place the plurality of reference vectors and the corresponding geographical obstruction labels in a vector database supporting fast similarity search of high-dimensional vectors, such as Milvus, Faiss, etc.

The future time period refers to a preset time period in the future after the current moment.

The scenario stability refers to an indicator reflecting a stable degree of an application scenario of the aircraft. The scenario stability sequence of the future time period refers to a sequence composed of scenario stabilities corresponding to a plurality of time points in the future time period.

The stability determination model refers to a model for determining the scenario stability sequence. In some embodiments, the stability determination model may be a machine learning model. For example, the stability determination model may be any one of Neural Networks (NN), Recurrent Neural Networks (RNN), or the like, or any combination thereof. In some embodiments, an input of the stability determination model may include the geographical obstruction and the historical observation data, and an output of the stability determination model may include the scenario stability sequence.

In some embodiments, the stability determination model may be obtained by training based on a training sample set.

The training sample set may include a plurality of training samples and training labels corresponding to the plurality of training samples. In some embodiments, the processor may determine at least one set of sample categories based on sequence lengths of the training labels. The at least one set of sample categories may include a plurality of subsamples. The proportion of a count of subsamples of different sample categories to the training sample set may be positively correlated with the sequence lengths of the corresponding training labels. The proportion of a count of subsamples of at least one set of sample categories to the training sample set may not less than a preset proportion threshold. The training samples may include special training samples of which the proportion is greater than a special proportion threshold.

In some embodiments, the training samples may include sample geographical obstruction and sample historical observation data of a first historical time period in a historical record. The training labels may include historical actual scenario stability sequences of a second historical time period corresponding to the training samples. The training labels may be automatically labeled by the system based on the historical records. The second historical time period may be a future time period of the first historical time period.

The actual scenario stability sequences corresponding to the training samples may be that the processor scores the scenario stabilities at the plurality of time points of the second historical time period based on the transmission rate, the signal strength, the transmission quality (e.g., Bit Error Rate (BER), signal distortion, a signal-noise ratio, etc.), and the delay of the actual signals at the plurality of time points of the second historical time period based on a determination rule to form the scenario stability sequences. The determination rule may be that the higher the transmission rate, the higher the signal strength, the better the transmission quality, and the lower the delay, the higher the scenario stability.

The transmission quality may be calculated from a linear combination of the bit error rate, the signal distortion, and the signal-to-noise ratio. In some embodiments, the ground station or the aircraft may be configured with a distortion meter, and the processor may obtain the signal distortion via the distortion meter.

In some embodiments, the processor may obtain special training samples by performing collection of the training samples and the training labels under a special condition during sample collection. The special condition refers to a condition of a rarer or more extreme application scenario. For example, the processor may actively collect the training samples and the training labels under the special conditions (e.g., bad weather, an area with excessive user density, a complex terrain, etc.) as the special training samples. A proportion of the special training samples may be greater than a special proportion threshold. The special proportion threshold may be preset manually.

In some embodiments, the processor may use sample historical observation data of various time lengths as an input pf the model during training, such that the stability determination model may learn short-term and long-term trends during training, improving the ability to respond to data at different time scales. For example, the sample historical observation data may include sample historical observation data with a time length of 5 min, 10 min, and 15 min.

It is understood that the longer the future time period that needs to be predicted, the higher the prediction difficulty, and more training samples may be required accordingly. Therefore, a proportion of the count of the subsamples corresponding to the sample categories may be set to be positively correlated with the sequence lengths of the corresponding training labels of the subsamples, and the proportion of the count of the subsamples corresponding to each set of sample categories may not be less than the preset proportion threshold. The sequence lengths of the corresponding training labels may be time durations corresponding to the scenario stability sequence in the training labels.

For example, in the training samples, training labels corresponding to the second historical time period that is 5-10 min later than the first historical time period may be a first sample category, and training labels corresponding to the second historical time period that is 10-20 min later than the first historical time period may be a second sample category. Since a scenario stability sequence corresponding to the second sample category is longer, the processor may increase the proportion of the count of subsamples of the second sample category in the training samples. In some embodiments, the processor may also correspond the sequence length of the training label to the time duration of the sample historical observation data in the same training sample.

In some embodiments, the processor may input a large number of training samples into an initial stability determination model, construct a loss function based on an output of the initial stability determination model and the training labels corresponding to the training samples, and perform an iterative update on the initial stability determination model based on the loss function. When a value of the loss function satisfies an iteration completion condition, the training may be completed and a trained stability determination model may be obtained. The iteration completion condition may include that the loss function converges, a count of iterations reaches a threshold, or the like.

In some embodiments of the present disclosure, when the stability determination model is trained, the model is enabled to maintain stable performance even in rare but important scenarios by adding the special training samples in the training samples. By classifying the training samples based on the sequence lengths of the corresponding training labels and adjusting the proportion of each sample category in the training samples based on the sequence length, the stability determination model may learn both the short-term and long-term trends, thereby improving responsiveness to events on different time scales.

In some embodiments, the input of the stability determination model may further include weather data and user distribution data.

The weather data refers to data about weather conditions over a current and historical time period. For example, the weather data may include precipitation, wind speed, weather types (e.g., rainy and foggy days, etc.), air dust levels, etc., of the current and historical time period. In some embodiments, the processor may obtain the weather data through a third-party platform. For example, the processor may obtain the weather data via a weather forecasting network.

The user distribution data refers to data reflecting a density of user distribution in a region. For example, the user distribution data of one region may be characterized by a count of user devices in the region. In some embodiments, the processor may obtain the user distribution data through a third party. For example, the processor may obtain the user distribution data in the region via an administrator of a regional network (e.g., a local area network (LAN), a metropolitan area network (MAN), etc.) corresponding to the region.

In some embodiments, when the input of the stability determination model further includes the weather data and the user distribution data, the processor may add sample weather data and sample user distribution data corresponding to the training samples to the training samples during training based on historical records, and obtain the trained stability determination model by training in a manner similar to that described above.

In some embodiments of the present disclosure, by adding the weather data and the user distribution data to the input of the stability determination model, the interference of the weather conditions and the user distribution on the aircraft may be considered, such that the stability determination model obtained from the training is more reasonable, which in turn outputs a more accurate scenario stability sequence.

The discount factor sequence of the future time period refers to a sequence consisting of discount factors at the plurality of time points in the future time period. More descriptions regarding the discount factor may be found in the related descriptions in the step 3 of Embodiment 1.

In some embodiments, the scenario stability may be positively correlated with the discount factor $\gamma$. In some embodiments, the technician may construct, based on the historical data, a second preset table comprising the correspondence between the scenario stability and the discount factor, and the processor may determine, by querying the second predetermined table, the discount factor corresponding to each scenario stability in the scenario stability sequence, thereby determining the discount factor sequence.

In some embodiments of the present disclosure, when the scenario is unstable, it indicates a greater uncertainty in a predicted future state of the current application scenario. In this case, the agent may place more emphasis on near-term reward, i.e., use a lower discount factor. On the contrary, when the scenario is relatively stable, it means that the prediction of the future state is more reliable, and the current decision may place more emphasis on the long-term effects, i.e., use a higher discount factor. By determining the scenario stability sequence of the future time period, and then determining the discount factor sequence of the future time period, the reward function may be set more rationally, such that the construction of the Markov decision process model may be more logical.

In some embodiments, in response to determining that the scenario stability sequence satisfies a deceleration condition, the processor may generate a deceleration parameter based on the scenario stability sequence; and send the deceleration parameter to the aircraft to adjust a movement speed of the aircraft.

The deceleration condition refers to a condition used to determine whether the aircraft decelerates. For example, the deceleration condition may be that an average value of the scenario stability sequence is less than a deceleration threshold. The deceleration threshold refers to a threshold related to the scenario stability and may be preset by the technician based on experience.

The deceleration parameter refers to a relevant parameter used to decelerate the aircraft. For example, the deceleration parameter may include a deceleration amplitude, a deceleration rate, or the like. The deceleration rate refers to a rate at which the speed decreases over time.

In some embodiments, in response to determining that the scenario stability sequence satisfies the deceleration condition, the processor may generate the deceleration parameter based on the scenario stability sequence in various ways. For example, the deceleration magnitude in the deceleration parameter may be negatively correlated with an average value of all scenario stabilities in the scenario stability sequence. The deceleration rate may be preset manually.

In some embodiments, the processor may send the deceleration parameter to the aircraft, and the aircraft may adjust the movement speed of the aircraft according to the deceleration parameter. It should be noted that the movement speed of the aircraft after deceleration may not be lower than a minimum navigational speed of the aircraft. The minimum navigational speed may be preset manually based on the priori knowledge or experience.

In some embodiments of the present disclosure, when the predicted scenario stability sequence is low, it is indicated that the current movement speed of the aircraft is too fast. By generating the deceleration parameter based on the scenario stability sequence to adjust the movement speed of the aircraft, the movement speed of the aircraft may be kept in a reasonable range, thereby improving the scenario stability.

In some embodiments, the step 3 may further include the following steps: obtaining a risk tolerance; determining a coefficient selection range based on the risk tolerance; determining candidate constraint coefficients based on the coefficient selection range; and determining constraint coefficients based on the candidate constraint coefficients.

In some embodiments, the constraint coefficients may include a first coefficient and a second coefficient. More descriptions regarding the constraint coefficients, the first coefficient, and the second coefficient may be found in the related descriptions of the step 3 of Embodiment 1.

The risk tolerance refers to a maximum level of risk that the system may tolerate in the face of uncertainty about the consequence and cost of constraint violation. In some embodiments, the risk tolerance may be lower when violating the constraint results in a severe consequence or high cost.

In some embodiments, the risk tolerance may be determined based on empirical human input.

The coefficient selection range refers to a range from which the constraint coefficients may be selected, which may include, for example, a range of the first coefficient and the second coefficient.

In some embodiments, when the system goal is predominantly to maximize the system transmission rate (i.e., relatively high risk tolerance), k1 may be set larger to encourage the agent to increase the transmission rate. When the system has strict requirements for constraint satisfaction (i.e., relatively low risk tolerance), such as a greater focus on interference avoidance, energy restriction, security, etc., k2 may be set larger to ensure that the agent may not easily violate the constraints. In a highly dynamic channel environment, the transmission rate may change faster, and the system needs to respond quickly. In this case, appropriately adjusting k1 may be faster to adapt to the environmental change. If the interference between different cells is relatively severe, k2 may be raised appropriately to limit the interference to the neighboring cells.

In some embodiments, the processor may determine the coefficient selection range based on the risk tolerance by querying a third preset table. The third predetermined table may include a correspondence between the risk tolerance and the coefficient selection range, and may be constructed based on historical records and prior knowledge. For example, the lower the risk tolerance, the higher the overall coefficient selection range corresponding to k2 may be set, and the lower the overall coefficient selection range corresponding to k1 may be set. For example, the coefficient selection range corresponding to k1 may be set to (0.1-0.3), and the coefficient selection range corresponding to k2 may be set to (0.6-0.8).

In some embodiments, the coefficient selection range may also be related to the scenario stability sequence. More descriptions regarding the scenario stability sequence may be found in the present disclosure above.

In some embodiments, the processor may determine a constraint range indicator based on the risk tolerance and the scenario stability sequence, and determine the coefficient selection range by querying a fourth preset table. The fourth predetermined table may include a correspondence between the constraint range indicator and the coefficient selection range, and may be constructed based on the historical records and the priori knowledge. For example, the lower the constraint range indicator, the higher the overall coefficient selection range corresponding to k2 may be set, and the lower the overall coefficient selection range corresponding to k1 may be set.

In some embodiments, the constraint range indicator I_k may be determined based on the risk tolerance and the scenario stability sequence according to the following Equation (18):

$$I\_k = a*f + b1*s1 + b2*s2 + \ldots + bn*sn \tag{18}$$

wherein f denotes the risk tolerance, and s1-sn represent a scenario stability at a future moment 1—a scenario stability sequence at future moment n, i.e., the scenario stabilities corresponding to n future time points in the scenario stability sequence, respectively; a, b1, b2, . . . , bn denote coefficients and b1>b2 . . . >bn, i.e., the closer the predicted future time point is to the present moment, the more reliable the prediction, and the larger the corresponding coefficient.

In some embodiments of the present disclosure, by considering the situations such as the risk tolerance and the scenario stability sequence, a relatively good coefficient range can be accurately determined, thereby improving the efficiency and accuracy of the subsequent determination of the candidate constraint coefficients and the constraint coefficients.

The candidate constraint coefficients refer to alternative values of the constraint coefficients. In some embodiments, the candidate constraint coefficients may include candidate first coefficients and candidate second coefficients, i.e., candidates of k1 and candidates of k2.

In some embodiments, the processor may determine the candidate constraint coefficients in various ways. For example, the processor may randomly select a candidate first coefficient and a candidate second coefficient as a set of candidate constraint coefficients in the coefficient selection range.

In some embodiments, the processor may determine the constraint coefficients based on the candidate constraint coefficients in various ways. For example, the processor may obtain application scores corresponding to each set of candidate constraint coefficients by inputting each set of the at least one set of candidate constraint coefficients into an application scoring model, and select a set of candidate constraint coefficients that have the highest application score and are greater than a score threshold as the constraint coefficients. The score threshold refers to a threshold for constraining an application score.

The application scores of the candidate constraint coefficients refer to the evaluation of reasonableness of the equation after the candidate constraint coefficients are used. The higher the application score, the more reasonably the candidate constraint coefficients are set.

The application scoring model refers to a model for evaluating the candidate constraint coefficients. In some embodiments, the application scoring model may be a machine learning model. For example, the application scoring model may be a neural network model, etc. In some embodiments, an input of the application scoring model may include the candidate constraint coefficients, the scenario stability sequence, jamming data, a transmission task type, and a battery status of the aircraft, and an output of the application scoring model may include the application scores of the candidate constraint coefficients. More descriptions regarding the scenario stability sequence and the interference data may be found in the present disclosure above.

The transmission task type refers to a type of a current signal transmission task, which may include, for example, a real-time task, a streaming task, a large-scale data transmission task, or the like. The battery status of the aircraft may include remaining power, a power consumption rate, etc.

In some embodiments, the application scoring model may be acquired based on a large number of scoring training samples with scoring labels. The scoring training samples may include sample constraint coefficients and sample scenario stability sequences of the third historical time period in the corresponding historical records, sample interference data, sample transmission task types, and sample battery statuses of the aircraft, and the scoring labels may include actual application scores of the fourth historical time period corresponding to the scoring training samples. The scoring labels may be automatically calculated and labeled by the system based on the historical records. For example, after a period of operation using samples k1 and k2, the processor may collect the transmission rate, delay, user scores, or the like, during this time period, and calculate the scoring labels through weighted averaging, or the like. The fourth historical time period refers to a future time period of the third historical time period.

A training mode of the application scoring model may be similar to that of the stability determination models, which may be found in the related descriptions above.

In some embodiments, the processor may further determine the constraint coefficients using an artificial intelligence (AI) algorithm based on the application scoring model. For example, the steps may be as follows:

1. a count n of particles, i.e., a population size, may be determined, which may be preset manually; a position (which is equivalent to determining a plurality sets of candidate constraint coefficients) of each particle may be randomly initialized based on the coefficient selection range, coordinates of each position representing candidate values of k1 and k2, and each particle being initialized with a random speed vector;
2. for each particle, an application score of the particle may be obtained by inputting the coordinates (k1, k2) of the position of each particle into the application scoring model;
3. for each particle, the coordinates of the optimal position in history of the particle, i.e., the values of k1 and k2 at the highest application score, may be recorded; coordinates of the optimal position of the population may be recorded, the optimal position of the population being the position corresponding to the highest application score of all the particles in history;
4. the speed and the position of each particle may be updated according to the following Equation (19):

$$v_i(t+1)=w \cdot v_i(t)+c1 \cdot r1 \cdot (pbest_i(t)-x_i(t))+c2 \cdot r2 \cdot (gbest(t)-x_i(t));$$

$$x_i(t+1)=x_i(t)+v_i(t+1) \qquad (19)$$

wherein i=1,2, ..., n, $v_i(t)$ denotes the speed of a particle i at time t, $v_i(t+1)$ denotes the speed of the particle i at time t+1, $x_i(t)$ denotes the position of the particle i at time t, $x_i(t+1)$ denotes the position of the particle i at time t+1; W denotes an inertia weight, which controls the particle to keep the current speed, c1 and c2 denote acceleration constants, which represent the confidence of the particle in the experience of the particle and the population experience, respectively, r1 and r2 denote random numbers within an interval [0,1], $pbest_i(t)$ denotes the historical optimal position of the particle i at time t, and gbest(t) denotes the optimal position of the population at time t;

5. the steps 2-4 may be iteratively performed until a termination condition is satisfied, wherein the termination condition may be that the maximum count of iterations is reached or the application score converges; finally, the values of the coordinates (k1, k2) corresponding to the particle of the optimal position in the population may be the constraint coefficients finally determined in the algorithm.

In some embodiments, w may be negatively correlated with the scenario stability in the scenario stability sequence. For example, w may be negatively correlated with a maximum value or an average value of the scenario stability in the scenario stability sequence. It is understood that if the scenario is relatively stable, it is more likely to find the global optimal solution quickly; if the scenario stability is relatively low, it may not find the global optimal solution or take a long time to find the global optimal solution. In this case, w may be increased to improve efficiency, so as to determine a local optimal solution as soon as possible. More descriptions regarding the scenario stability may be found in the present disclosure above.

In some embodiments of the present disclosure, the optimal constraint coefficients may be further determined by determining the coefficient selection range, which ensures that the system adapts to the change in the environment faster even when the system objectives are different, such as avoiding interference, energy restriction, limiting interference to neighboring cells, etc.

In some embodiments, the step 3 may further include the following steps: dynamically adjusting the first coefficient and the second coefficient based on the system transmission rate. More descriptions regarding the system transmission rate may be found in the related description of the step 2 of Example 1 or FIG. 4.

In some embodiments, the processor may dynamically adjust the first coefficient and second coefficient by determining a relationship of size between the system transmission rate and a preset transmission rate and the count of constraint violations. The preset transmission rate refers to a threshold related to the system transmission rate, which may be preset manually.

For example, when the system transmission rate is less than the present transmission rate, a higher rate may be achieved by increasing k1; and when the count of violations of the constraint C5 is greater than a violation threshold, the violation may be reduced by increasing k2. An increasing value and a decreasing value may be fixed and may be obtained by presetting. More descriptions regarding the constraints may be found in the related descriptions of the step 3 of the Embodiment 1.

In some embodiments of the present disclosure, by dynamically adjusting the first coefficient and the second coefficient, the system can adjust the relevant coefficients in time according to the system transmission rate and the count of constraint violations, such that a more reasonable reward function can be determined under different operating environments and conditions, and the results obtained from the subsequent solving of the optimization problem can be more reliable.

It should be noted that the foregoing descriptions of the steps 1-6 of the coordinated multiple access method for multi-cell ground-to-air data transmission are for the purpose of example and illustration only, and do not limit the scope of application of the present disclosure. For a person skilled in the art, various corrections and changes may be made to the steps 1-6 of the coordinated multiple access method for multi-cell ground-to-air data transmission under the guidance of the present disclosure. However, such corrections and changes remain within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A coordinated multiple access method for multi-cell ground-to-air data transmission, implemented based on a processor, comprising:

S1. constructing a model of a coordinated multiple access system for multi-cell ground-to-air data transmission, including constructing a scenario model and constructing a channel model; wherein the constructing a scenario model includes that:

each cell consists of a cell-center area and a cell-edge area; a ground station is located at a center of a corresponding cell, and the ground station implements backhaul transmission through optical fibers; an aircraft located in the cell-center area is served by a ground station to which the aircraft belongs, and an aircraft located in the cell-edge area is served by a plurality of ground stations to implement data transmission simultaneously using a CoMP technology;

three adjacent ground stations form a consideration range of a regular hexagon as three non-adjacent vertices of the regular hexagon;

the constructing the channel model includes that:

each ground station sends signals to a single-antenna aircraft using a horizontally placed uniform planar array antenna, wherein a count of available subcarriers is denoted as X, a total count of planar array antennas is denoted as N, and a transmission bandwidth is denoted as B; wherein the channel model for aeronautical broadband communication is constructed based on a Saleh-Valenzuela channel model; a channel of an x-th subcarrier between the ground station and the aircraft is expressed as:

$$h[x] = \sum_{l=1}^{L} \alpha_l e^{j2\pi f_x \tau_l} a^H(\theta_l, \varphi_l) \quad (1)$$

wherein L denotes a count of multipaths, $a_l$ denotes a gain of an l-th path, j denotes an imaginary unit, $f_x$ denotes a frequency selective fading coefficient on a subcarrier x, $\tau_l$ denotes an arrival delay of the l-th path, $a(\theta_l, \varphi_l)$ denotes an array steering vector, $\theta_l$ denotes a pitch angle of the aircraft relative to a planar array, $\varphi_l$ denotes an azimuth angle of the aircraft relative to the planar array, and H denotes conjugate transpose of a matrix;

S2. calculating a transmission rate of the aircraft within the consideration range, and constructing a multi-cell airspace and power domain resource allocation optimization problem by taking maximizing a system transmission rate as an optimization objective;

S3. constructing a Markov decision process model based on the optimization objective and constraints;

S4. solving the optimization problem using a multi-agent deep reinforcement learning algorithm; wherein i, n, and z denote different aircrafts;

in S1, the three ground stations simultaneously serve a cell-edge aircraft k through CoMP transmission, let $\alpha \in 1,2,3$ denote a ground station index, $h_{a,k}[x]$ denotes a channel response matrix between a ground station a and the cell-edge aircraft k on the subcarrier x, $m_{a,k}$ denotes a cluster of the cell-edge aircraft k in the ground station a, $m_a'$ denotes other clusters in the ground station a, $\mathcal{G}_{m_{a,k}}$ and $\mathcal{G}_{m_a'}$ denote a set of aircrafts in the clusters $m_{a,k}$ and $m_a'$, respectively, $w_{a,m_{a,k}}[x]$ and $w_{a,m_a'}[x]$ denote hybrid beamforming vectors of the ground station a for the clusters $m_{a,k}$ and $m_a'$ on the subcarrier x respectively, $p_{a,k}[x]$, $p_{a,i}[x]$, and $p_{a,n}[x]$ denote power allocation variables of the ground station a for aircrafts k, i, n on the subcarrier x, respectively, $s_k[x]$, $s_i[x]$, and $s_n[x]$ denote signals received by the aircrafts k, i, n on the subcarrier x, respectively, and $n_k[x]$ denotes noise of the cell-edge aircraft k on the subcarrier x;

the signal received by the cell-edge aircraft k on the subcarrier x is expressed as:

$$y_k[x] = \underbrace{\sum_{a=1}^{3} h_{a,k}[x] w_{a,m_{a,k}}[x] \sqrt{p_{a,k}[x]} s_k[x]}_{useful\ signal} + \quad (2)$$

$$\underbrace{\sum_{a=1}^{3} \sum_{i \neq k, i \in q\mathcal{G}_{m_{a,k}}} h_{a,k}[x] w_{a,m_{a,k}}[x] \sqrt{p_{a,i}[x]} s_i[x]}_{Intra-cluster\ interference} +$$

$$\underbrace{\sum_{a=1}^{3} \sum_{m_a' \neq m_{a,k}, n \in \mathcal{G}_{m_a'}} h_{a,k}[x] w_{a,m_a'}[x] \sqrt{p_{a,n}[x]} s_n[x] + n_k[x]}_{inter-cluster\ interference}$$

assuming considering a scenario of coherent joint transmission (CJT) based on an ideal backhaul capacity, real-time channel state information is shared among the ground stations, a capacity gain is obtained by coherent merging of multipath signals at the cell-edge aircraft k, and power $P_{desired}$ of a received useful signal is a power of a sum of the useful signals from all the ground stations, which is expressed as:

$$P_{desired} = \left| \sum_{a=1}^{3} h_{a,k}[x] w_{a,m_{a,k}}[x] \sqrt{p_{a,k}[x]} \right|^2 \quad (3)$$

a signal interference received by a cell-center aircraft k' served by a ground station a' includes a signal interference from the cell-edge aircraft, a signal interference from the cell-center aircraft of a current cell and neighboring cells, $K^C$ denotes a set of the cell-edge aircrafts, $K_a^N$ and $K_a^N$ denote a set of cell-center aircrafts served by the ground station a' and a set of cell-center aircrafts served by the ground station a, respectively, $h_{a',k'}[x]$ and $h_{a,k'}[x]$ denote channels from the ground station a' and the ground station a to the cell-center aircraft k' on the subcarrier x, respectively, $p_{a',k'}[x]$ and $p_{a,k}[x]$ denote power allocation variables of the ground station a' to the aircrafts k' and i on the subcarrier x, respectively, $s_k[x]$ denotes a signal received by the cell-center aircraft k' on the subcarrier x, $m_{a',k'}$ and $m_{a',i}$ denote clusters of the aircrafts k' and i in the ground station a', respectively, $m_{a,k}$ and $m_{a,n}$ denote the clusters of the aircrafts k and n in the ground station a, respectively, $w_{a',m_{a',k}}[x]$ and $w_{a',m_{a',i}}[x]$ respectively denote hybrid beamforming vectors of the ground station a' on subcarrier x for the clusters $m_{a',k'}$ and $m_{a',i}$; $w_{a,m_{a,k}}[x]$ and $w_{a,m_{a,n}}[x]$ denote the hybrid beamforming vectors of the ground station a on the subcarrier x for the clusters $m_{a,k}$ and $m_{a,n}$, respectively; $n_{k'}[x]$ denotes noise of the cell-center aircraft k' on the subcarrier x, and the signal received by the cell-center aircraft k' served by the ground station a' on the subcarrier x is expressed as:

$$y_{a',k'}[x] = \underbrace{h_{a',k'}[x]w_{a',m_{a',k'}}[x]\sqrt{p_{a',k'}[x]}s_{k'}[x]}_{useful\ signal} + \tag{4}$$

$$n_{k'}[x] + \underbrace{\sum_{k \in K^c}\sum_{a=1}^{3}h_{a,k'}[x]w_{a,k}[x]\sqrt{p_{a,k}[x]}s_k[x]}_{signal\ interference\ from\ the\ cell-edge\ aircrafts} +$$

$$\underbrace{\sum_{i \in K_{a',i \neq k}^{N}} h_{a',k'}[x]w_{a,m_{a',i}}[x]\sqrt{p_{a',i}[x]}s_i[x]}_{signal\ interference\ from\ the\ cell-center\ aircraft\ of\ the\ current\ cell} +$$

$$\underbrace{\sum_{a \neq a'}\sum_{n \in K_a^N}h_{a,k'}[x]w_{a,m_{a,n}}[x]\sqrt{p_{a,n}[x]}s_n[x]}_{signal\ interference\ from\ the\ cell-center\ aircrafts\ of\ neighboring\ cells}$$

in S2, the calculating a transmission rate of the aircraft within the consideration range, and constructing a multi-cell airspace and power domain resource allocation optimization problem by taking maximizing a system transmission rate as an optimization objective includes:

S21. calculating a transmission rate of the cell-edge aircraft k; wherein $a_{k,i}^{m_{a,k}}$ denotes an SIC decoding order of the cell-edge aircraft k and the aircraft i of the cluster $m_{a,k}$ in the ground station a, $a_{k,i}^{m_{a,k}}=0$ means that a receiver of the cell-edge aircraft k of the cluster $m_{a,k}$ first decodes the signal of the aircraft i and eliminates the signal using an SIC technology; otherwise, $a_{k,i}^{m_{a,k}}=1$ means that the receiver of the cell-edge aircraft k of the cluster $m_{a,k}$ first decodes the signal of the cell-edge aircraft k, accordingly, it is deduced that the transmission rate $R_k[x]$ between the ground station a and the cell-edge aircraft k on the subcarrier x is expressed as:

$$R_k[x] = B\log_2\left(1 + \frac{P_{desired}}{I_C + I_N + \sigma_k^2}\right) \tag{5}$$

$$I_C = \sum_{i \neq k, i \in K^c}\sum_{a=1}^{3}\alpha_{k,i}^{m_{a,k}}[x]|h_{a,k}[x]w_{a,m_{a,i}}[x]\sqrt{p_{a,i}[x]}|^2$$

$$I_N = \sum_{a=1}^{3}\sum_{n \in K_a^N}|h_{a,k}[x]w_{a,m_{a,n}}[x]|^2 p_{a,n}[x]$$

wherein $I_C$ denotes a signal interference of other cell-edge aircrafts except the cell-edge aircraft k, $I_N$ denotes the signal interference of the cell-center aircraft, $\sigma_k^2$ denotes noise power; and $w_{a,m_{a,i}}[x]$ denotes a hybrid beamforming vector of the ground station a for the cluster $m_{a,i}$ on the subcarrier x;

S22, calculating a transmission rate of the cell-center aircraft k'; wherein
the transmission rate $R_{a,k'}[x]$ of the cell-center aircraft k' served by the ground station a' is expressed as:

$$R_{a,k'}[x] = B\log_2\left(1 + \frac{|h_{a',k'}[x]w_{a',m_{a',k'}}[x]|^2 p_{a',k'}[x]}{ICI_C + INI_N + ICI_N + ICI_{cell} + \sigma_{k'}^2}\right) \tag{6}$$

$$ICI_C = \sum_{k \in \{K^c - \mathcal{G}_{m_{a',k'}}\}}\sum_{a=1}^{3}|h_{a,k}[x]w_{a,m_{a,k}}[x]\sqrt{p_{a,k}[x]}|^2$$

$$INI_N = \sum_{z \neq k', z \in \mathcal{G}_{m_{a',k'}}}\alpha_{k',z}^{m_{a',k'}}[x]|h_{a',k'}[x]w_{a,m_{a',k'}}[x]|^2 p_{a',z}[x]$$

$$ICI_N = \sum_{i \in \{K_{a'}^N - \mathcal{G}_{m'k'}\}}|h_{a',k'}[x]w_{a',m_{a',i}}[x]|^2 p_{a',i}[x]$$

$$ICI_{cell} = \sum_{a \neq a'}\sum_{n \in K_a^N}|h_{a,k'}[x]w_{a,m_{a,n}}[x]|^2 p_{a,n}[x]$$

wherein $ICI_C$ denotes an inter-cluster interference to the cell-center aircraft k' from the cell-edge aircraft, and $ICI_C$ is 0 if the cell-center aircraft k' and the cell-edge aircraft are in the same cluster; $INI_N$ and $ICI_N$ denote signal interferences of the cell-center aircrafts in the same cluster and different clusters as the cell-center aircraft k' in the ground station a', respectively; $ICI_{cell}$ denotes inter-cell signal interferences caused by cell-center aircrafts served by neighboring ground stations; $\mathcal{G}_{m_{a,k}}$ denotes a set of aircrafts in a cluster $m_{a',k'}$, $p_{a',z}[x]$ denotes a power allocation variable of the ground station a' to an aircraft z on the subcarrier x, $a_{k',z}^{m_{a,k'}}$ denotes an SIC decoding order of the cell-edge aircraft k' and the aircraft z of the cluster $m_{a',k'}$ in the ground station a'; and $\sigma_k^2$ denotes noise power of the aircraft k';

S23. constructing a multi-cell joint transmission resource allocation optimization problem; wherein
the optimization variables are transmission power of each ground station to each aircraft and a hybrid analog and digital beamforming vector for each cluster, P denotes total power that each ground station can allocate to the aircraft on each subcarrier, $W_{a,A}$ denotes an analog beamforming matrix of the ground station a, F denotes all elements in $W_{a,A}$, $W_{a,A}(c_x, c_y)$ denotes elements at coordinates $(c_x, c_y)$ in the matrix $W_{a,A}$, $w_{a,D,m_{a,n}}[x]$ denotes a digital beamforming vector of the ground station a for a cluster $m_{a,n}$ on the subcarrier x, which satisfies $w_{a,m_{a,n}}[x] = W_{a,A} \times w_{a,D,m_{a,n}}[x]$, $R_n[x]$ denotes a transmission rate of an aircraft n on the subcarrier x, $R_n^{thr}[x]$ denotes a minimum transmission rate threshold of the aircraft n, and constructing the multi-cell joint transmission resource allocation optimization problem is expressed as follows:

$$\max_{\{W_{a,A}, w_{a,D,m_{a,n}}[x], p_{a,n}[x]\}}\sum_{x=1}^{X}\left(\sum_{k \in K}cR_k[x] + \sum_{a'=1}^{3}\sum_{k' \in K_{a'}^N}R_{a',k'}[x]\right) \tag{7}$$

-continued $$C1: \sum_{n\in\{k^C \cup K_a^N\}} p_{a,n}[x] \leq P, \forall a, x$$

$$C2: p_{a,n}[x] \geq 0, \forall a, n, x$$

$$C3: |W_{a,A}w_{a,D,m_{a,n}}[x]| = 1, \forall a, m_{a,n}, x$$

$$C4: |W_{a,A}(c_x, c_y)| = \frac{1}{\sqrt{N}}, \forall a, (c_x, c_y) \in F$$

$$C5: R_n[x] \geq R_n^{thr}[x], \forall x, a, n \in \{K^C \cup K_a^N\}$$

wherein a constraint C1 denotes a maximum transmission power limit of the ground station; a constraint C2 denotes a non-negative value constraint of power; a constraint C3 denotes a normalization constraint of the hybrid beamforming vector of the ground station; a constraint C4 denotes a constant modulus constraint of elements in an analog beamforming matrix; and a constraint C5 denotes a minimum transmission rate constraint of the aircraft n;

in order to correctly implement SIC decoding at the aircraft, a minimum value of the transmission rate of the cell-center aircraft k' served by the ground station a' at an aircraft of which a decoding order is later than the decoding order of the cell-center aircraft k' is taken as the transmission rate of the cell-center aircraft k', which is expressed as:

$$R_{a',k'}[x]=\min_{i\in \Phi_{a',k'}}\{R^{m_{a',k',i\rightarrow k}}[x]\} \quad (8)$$

wherein $\Phi_{a',k'}$ denotes a set of aircrafts in the same cluster as the cell-center aircraft k' in the ground station a' and whose decoding orders are not earlier than that of the cell-center aircraft k', i.e., $\Phi_{a',k'}=\{i|\alpha_{i,k'}^{m_{a',k}}[x]=0\}\cup\{k'\}$, wherein $\alpha_{i,k'}^{m_{a,k}}[x]$ denotes an SIC decoding order of the cell-center aircraft k' and an aircraft i of a cluster $m_{a',k'}$ in the ground station a'; and $R_{m_{a',k',i\rightarrow k}}[x]$ denotes a transmission rate of a signal of the cell-center aircraft k' decoded at the aircraft i of the cluster $m_{a',k'}$;

for the cell-edge aircraft k, since the signal of the cell-edge aircraft k participates in an SIC process of three ground stations, the transmission rate of the cell-edge aircraft k is less than transmission rates of aircrafts decoded later in the corresponding clusters of the all ground stations; $\Phi_{a,k}$ denotes a set of aircrafts in the same cluster as the cell-edge aircraft k in ground station a and whose decoding orders are not earlier than that of the cell-edge aircraft k, and $R_{m_{a,k,i\rightarrow k}}[x]$ denotes a transmission rate of the signal of the cell-edge aircraft k decoded at the aircraft i in a cluster $m_{a,k}$, which is expressed as:

$$R_k[x]=\min_{a\in\{1,2,3\},i\in\Phi_{a,k}}\{R_{m_{a,k,i\rightarrow k}}[x]\} \quad (9)$$

in S3, constructing the Markov decision process model includes a local observation state O, an action A, and a reward function R; wherein the local observation state O: for multi-agent deep reinforcement learning, each ground station is regarded as an agent, and local observation state information $o_{a,t}$ of the ground station a at a t-th step is defined as channel state information from the ground station a to each aircraft and a signal interference suffered by each aircraft; $h_{a,n}[x]$ denotes a channel from the ground station a to the aircraft n on the subcarrier x, $I_{a,n}[x]$ denotes a total signal interference intensity suffered by the aircraft n served by the ground station a on the subcarrier x, and the local observation state information $o_{a,t}$ is expressed as:

$$o_{a,t}=\{h_{a,n}[x],I_{a,n}[x]|x\in\{1,\ldots,X\},n\in K^C\cup K_a^N\} \quad (10)$$

the action A: an action $a_{a,t}$ of the ground station a in the t-th step consists of an analog beamforming matrix of the ground station a and power allocation to each aircraft; since the analog beamforming matrix needs to satisfy the constant modulus constraint, a modulus value of each element in the matrix is fixed to $1/\sqrt{N}$, so the action A only needs to contain a phase of each element in the analog beamforming matrix, which is expressed as:

$$a_{a,t}=\{W_{a,A}\}\cup\{p_{a,n}[x]|x\in\{1,\ldots,X\},n\in K^C\cup K_a^N\} \quad (11)$$

the reward function R: the reward function consists of a reward for achieving a high transmission rate in the ground station a and a penalty for violating the constraint;

for the optimization problem (7), the constraints C1 and C2 are satisfied by performing softmax normalization on the power allocation, while the constraints C3 and C4 are satisfied by normalizing the beamforming; accordingly, considering the constraint C5, when the transmission rate of the aircraft n in the ground station a does not satisfy the minimum transmission rate threshold, a negative penalty is fed back to an agent represented by the ground station a;

$C_{a,t}$ denotes a count of times the minimum transmission rate constraint of the ground station a is violated in the t-th step, then the reward of the ground station a in the t-th step is expressed as:

$$r_{a,t} = k_1 \sum_{x=1}^{X}\left(\sum_{k\in K^C}R_k[x] + \sum_{a'=1}^{3}\sum_{k'\in K_{a'}^N}R_{a',k'}[x]\right) - k_2 C_{a,t} \quad (12)$$

wherein constraint coefficients $k_1$, $k_2$ denote positive constant coefficients.

2. The method of claim 1, wherein in the step S1, the aircrafts are divided into M clusters according to channel correlation, wherein aircrafts with strong channel correlation are grouped into one cluster, and aircrafts with weak channel correlation are grouped into different clusters, aircrafts in the same cluster share the same beams, multi-aircraft signals are denoted using a non-orthogonal multiple access (NOMA) technology, inter-cluster interferences are eliminated using space division multiple access (SDMA), and adaptive multiple access is implemented in each cell.

* * * * *